(12) United States Patent
Singh

(10) Patent No.: US 10,714,223 B2
(45) Date of Patent: Jul. 14, 2020

(54) METHOD OF STORING HIGH LEVEL RADIOACTIVE WASTE

(71) Applicant: HOLTEC INTERNATIONAL, Camden, NJ (US)

(72) Inventor: Krishna P. Singh, Hobe Sound, FL (US)

(73) Assignee: HOLTEC INTERNATIONAL, Camden, NJ (US)

( * ) Notice: Subject to any disclaimer, the term of this patent is extended or adjusted under 35 U.S.C. 154(b) by 0 days.

(21) Appl. No.: 16/175,143

(22) Filed: Oct. 30, 2018

(65) Prior Publication Data
US 2019/0139661 A1    May 9, 2019

Related U.S. Application Data

(60) Provisional application No. 62/581,229, filed on Nov. 3, 2017.

(51) Int. Cl.
| G21F 5/10 | (2006.01) |
| G21F 5/008 | (2006.01) |
| G21F 5/005 | (2006.01) |

(52) U.S. Cl.
CPC .............. *G21F 5/10* (2013.01); *G21F 5/005* (2013.01); *G21F 5/008* (2013.01)

(58) Field of Classification Search
None
See application file for complete search history.

(56) References Cited

U.S. PATENT DOCUMENTS

| 3,448,859 A | 6/1969 | Hall et al. |
| 4,532,428 A | 7/1985 | Dyck et al. |
| 4,634,875 A | 1/1987 | Kugeler et al. |

(Continued)

FOREIGN PATENT DOCUMENTS

WO    2017087106 A2    5/2017

OTHER PUBLICATIONS

L. Caseres et al., Atmospheric Stress Corrosion Cracking Susceptibility of Welded and Unwelded 304, 304L, and 316L Austenitic Stainless Steels Commonly Used for Dry Cask Storage Containers Exposed to Marine Environments, Office of Nuclear Regulatory Research, U.S.NRC, Oct. 2010. US.

(Continued)

*Primary Examiner* — Michael J Logie
(74) *Attorney, Agent, or Firm* — The Belles Group, P.C.

(57) ABSTRACT

A method of storing high level radioactive waste, and specifically a method of adjusting or controlling the temperature of ventilation air flowing through a storage cavity of a ventilated system. The method includes positioning a metal canister containing high level radioactive waste in a storage cavity of the ventilated system. The ventilated system includes a cask body, a cask lid, a plurality of inlet ducts, and at least one outlet duct so that ventilation air can flow from atmosphere into the storage cavity where it is heated and then back out to the atmosphere. The method includes progressively reducing a cross-sectional area of one or more of the inlet ducts and/or the outlet duct over time so that a rate at which the ventilation air is heated within the storage cavity is maintained above a predetermined threshold to mitigate the risk of stress corrosion cracking in the metal canister.

8 Claims, 15 Drawing Sheets

(56) References Cited

U.S. PATENT DOCUMENTS

| | | | |
|---|---|---|---|
| 5,448,604 A | 9/1995 | William | |
| 5,753,925 A * | 5/1998 | Yamanaka | G21F 5/10 250/507.1 |
| 5,786,611 A | 7/1998 | Quapp et al. | |
| 6,519,307 B1 * | 2/2003 | Singh | G21F 5/10 250/506.1 |
| 7,264,770 B2 | 9/2007 | Andresen et al. | |
| 7,864,914 B2 | 1/2011 | Ishida et al. | |
| 8,175,211 B2 | 5/2012 | Ishida et al. | |
| 9,105,365 B2 * | 8/2015 | Singh | G21F 5/10 |
| 2003/0028065 A1 * | 2/2003 | Matsunaga | G21F 5/008 588/16 |
| 2003/0147486 A1 * | 8/2003 | Singh | G21C 19/06 376/272 |
| 2010/0027733 A1 * | 2/2010 | Cantonwine | G21C 3/32 376/434 |
| 2010/0284506 A1 | 11/2010 | Singh | |
| 2012/0037632 A1 * | 2/2012 | Singh | G21F 5/005 220/367.1 |
| 2012/0238200 A1 * | 9/2012 | Berkovitz | F24F 13/082 454/367 |
| 2014/0247916 A1 * | 9/2014 | Singh | G21F 5/06 376/272 |
| 2014/0329455 A1 * | 11/2014 | Singh | G21F 5/005 454/237 |
| 2015/0284506 A1 | 2/2015 | Reyenge et al. | |
| 2019/0103197 A1 * | 4/2019 | Singh | G21F 5/08 |

OTHER PUBLICATIONS

International Search Report—PCT/US18/58198 dated Feb. 26, 2019, pp. 1-11.

* cited by examiner

METHOD OF STORING HIGH LEVEL RADIOACTIVE WASTE

CROSS-REFERENCE TO RELATED PATENT APPLICATIONS

The present application claims the benefit of U.S. Provisional Patent Application Ser. No. 62/581,229, filed Nov. 3, 2017, the entirety of which is incorporated herein by reference.

BACKGROUND OF THE INVENTION

In the operation of nuclear reactors, it is customary to remove fuel assemblies after their energy has been depleted down to a predetermined level. Upon removal, this spent nuclear fuel ("SNF") is still highly radioactive and produces considerable heat, requiring that great care be taken in its packaging, transporting, and storing. In order to protect the environment from radiation exposure, SNF is first placed in a canister, which is typically a hermetically sealed canister that creates a confinement boundary about the SNF. The loaded canister is then transported and stored in a large cylindrical container called a cask. Generally, a transfer cask is used to transport spent nuclear fuel from location to location while a storage cask is used to store SNF for a determined period of time. Such storage casks may be vertically oriented or horizontally oriented.

The decay heat generated in a canister in a typical ventilated storage module is rejected to the environment by the air entering the storage space near the bottom and exiting near the top. The upward flow of the ventilation air is actuated and sustained by the heat delivered from the SNF convectively raising its temperature as it rises inside the module. Regardless of the flow configuration, as the air heats up during its upwards movement in the storage module cavity, it becomes lighter in density and its relative humidity decreases, i.e., it becomes drier.

Stress Corrosion Cracking (SCC) of stainless steel nuclear waste canisters and containers in storage at costal sites with harsh marine environments is an important issue receiving increased industry and regulatory scrutiny. Canister designers and manufactures take preventative measures to minimize the chance of SCC developing by maintaining controlled temperatures during welding processes and engineering large conservative margins into canisters to keep stresses at a minimum. Investigations on SCC have demonstrated that SCC has a strong dependence on the surface temperature of the stainless steel canister. The dependence on the surface temperature is driven by the mechanism of the deposit of airborne contaminants (e.g. chlorides) and subsequent deliquesce of those contaminants on the stainless steel surface. It is known that dry air (defined as its relative humidity below 20%) cannot cause stress corrosion cracking. A higher surface temperature decreases the relative humidity of the air adjacent to the surface and prevents deliquesce the contaminants and subsequent penetration into the stainless steel surface, a precursor for SCC.

This means that if there is a sufficient amount of decay heat available, only a short lowermost region of the vertical canister and the bottom half of the horizontal canister are vulnerable to Stress Corrosion Cracking (hereinafter, "SCC"); the balance of the canister is not. The limited vulnerable region can be protected from SCC by other means such as peening. The problem arises, however, when the decay heat progressively declines with the passage of time, the heating of air becomes much slower making a greater portion of the canister vulnerable to SCC.

Thus, a need exists to reduce or prevent the risk of stress corrosion from spreading over the surface of a horizontal or vertical canister.

BRIEF SUMMARY OF THE INVENTION

Exemplary embodiments according to the present disclosure are directed to a method of storing high level radioactive waste, and specifically a method of adjusting or controlling the temperature of ventilation air flowing through a storage cavity of a ventilated system. The method includes positioning a metal canister containing high level radioactive waste in a storage cavity of the ventilated system. The ventilated system includes a cask body, a cask lid, a plurality of inlet ducts, and at least one outlet duct so that ventilation air can flow from atmosphere into the storage cavity where it is heated and then back out to the atmosphere. The method includes progressively reducing a cross-sectional area of one or more of the inlet ducts and/or the outlet duct over time so that a rate at which the ventilation air is heated within the storage cavity is maintained above a predetermined threshold to mitigate the risk of stress corrosion cracking in the metal canister.

In one aspect, the invention may be a method of storing high level radioactive waste comprising: a) positioning a metal canister containing high level radioactive waste in a storage cavity of a ventilated system comprising a cask body, a cask lid positioned atop the cask body, at least one outlet duct extending from a top of the storage cavity to an ambient atmosphere, and a plurality of inlet ducts, the plurality of inlet ducts having a combined cross-sectional area that is a sum of a cross-sectional area of each of the inlet ducts of the plurality of inlet ducts; b) convectively flowing ventilation air from the ambient atmosphere into a bottom of the storage cavity through the inlet ducts, the ventilation air being heated at a heating rate and rising from the bottom of the storage cavity to the top of the storage cavity, the ventilation air exiting the storage cavity through the at least one outlet duct; and c) progressively reducing the combined cross-sectional area of the plurality of inlet ducts over time to reduce an amount of the ventilation air that enters the storage cavity and maintain the heating rate of the ventilation air above a predetermined threshold.

In another aspect, the invention may be a method of storing high level radioactive waste comprising: a) positioning a metal canister containing high level radioactive waste in a storage cavity of a ventilated system comprising a cask body, a cask lid positioned atop the cask body, at least one outlet duct extending from a top of the storage cavity to an ambient atmosphere, and a plurality of inlet ducts, each of the inlet ducts having a cross-sectional area and the at least one outlet duct having a cross-sectional area; b) convectively flowing ventilation air from the ambient atmosphere into a bottom of the storage cavity through the inlet ducts, the ventilation air being heated at a heating rate and rising from the bottom of the storage cavity to the top of the storage cavity, the ventilation air exiting the storage cavity through the at least one outlet duct; c) positioning a first air flow adjustment member in at least one of: (1) one or more of the plurality of inlet ducts; or (2) the at least one outlet duct to reduce the cross-sectional area of the at least one of the one or more of the plurality of inlet ducts or the at least one outlet duct to maintain the heating rate of the ventilation air above a predetermined threshold; and wherein the first air flow adjustment member is selected to reduce the cross-sectional area of the at least one of the one or more of the plurality of inlet ducts or the at least one outlet duct by a predetermined percentage based on a first set of conditions measured at time T1.

In a further aspect, the invention may be a method of storing high level radioactive waste comprising: a) positioning a metal canister containing high level radioactive waste in a storage cavity of a ventilated system comprising a cask body, a cask lid positioned atop the cask body, at least one outlet duct extending from a top of the storage cavity to an ambient atmosphere, and a plurality of inlet ducts, the plurality of inlet ducts having a combined cross-sectional area and the at least one outlet duct having a combined cross-sectional area; b) convectively flowing ventilation air from the ambient atmosphere into a bottom of the storage cavity through the inlet ducts, the ventilation air being heated at a heating rate and rising from the bottom of the storage cavity to the top of the storage cavity, the ventilation air exiting the storage cavity through the at least one outlet duct; and c) modifying at least one of: (1) the combined cross-sectional area of the plurality of inlet ducts; or (2) the combined cross-sectional area of the at least one outlet duct over time to maintain the heating rate of the ventilation air above a predetermined threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
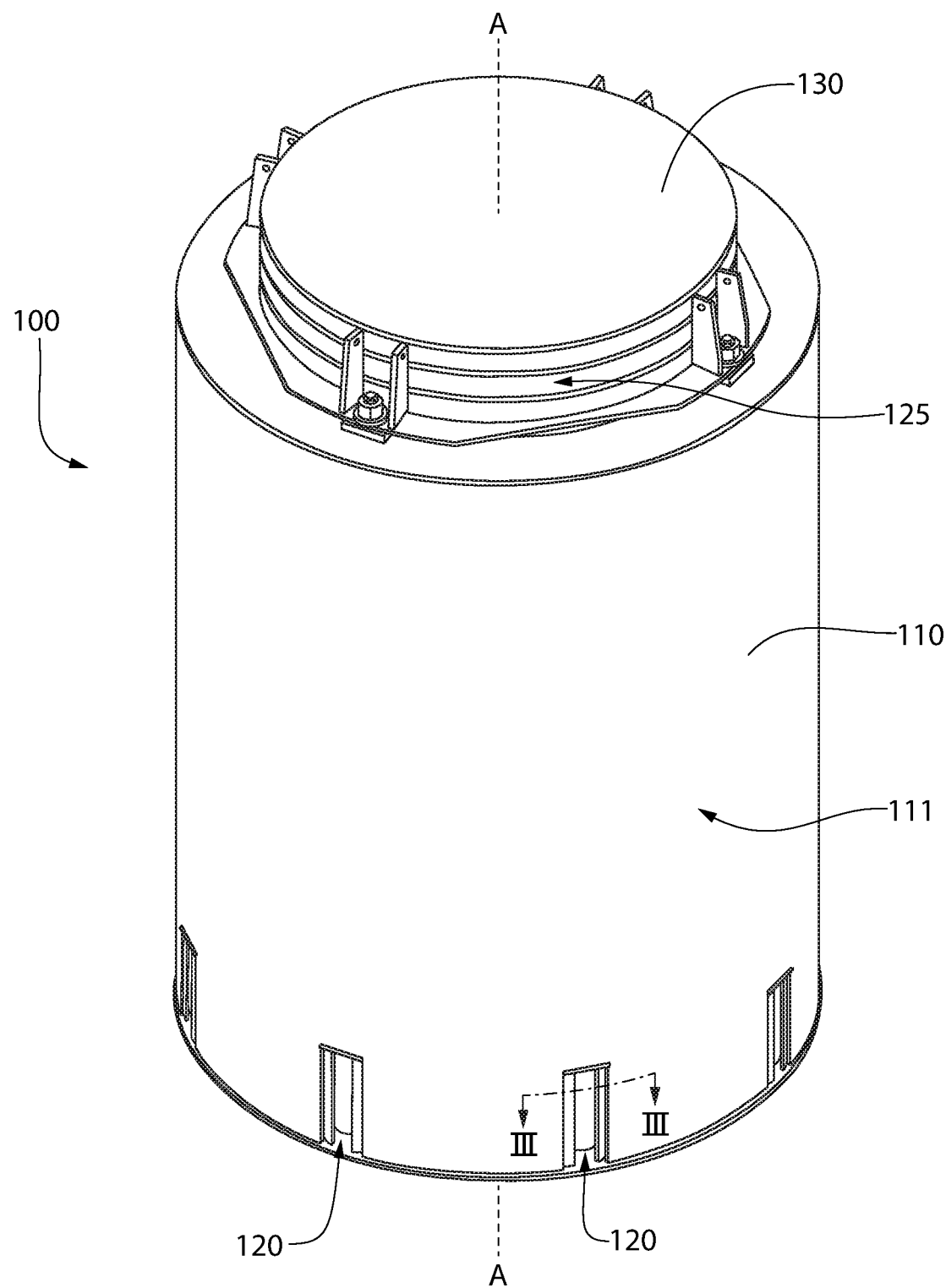
FIG. 1 is a front perspective view of a ventilated system for storing high level radioactive waste in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
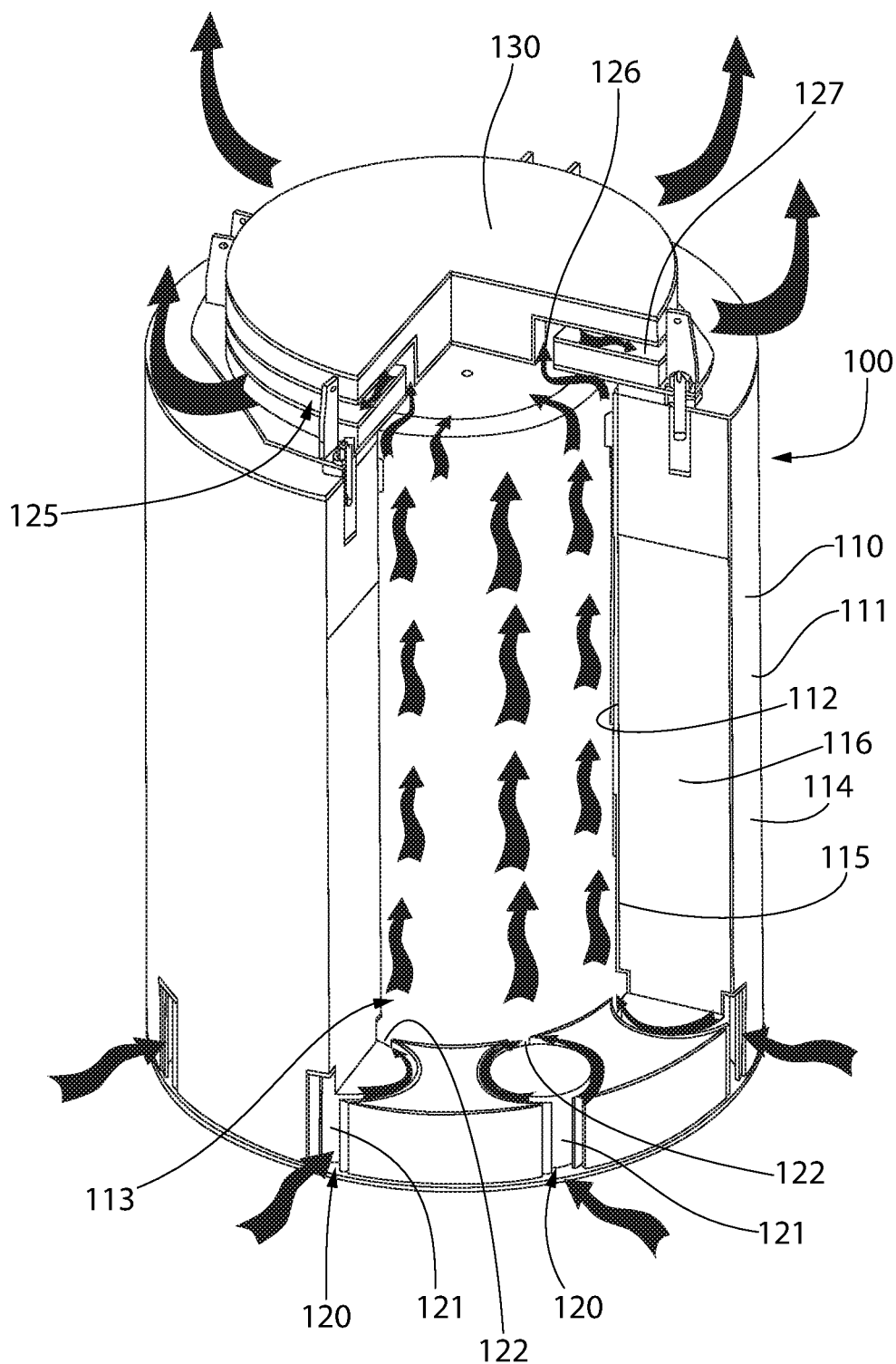
FIG. 2 is a partial cut-away view of the ventilated system of FIG. 1 illustrating the direction of ventilation air flow with arrows.
Figure 3:
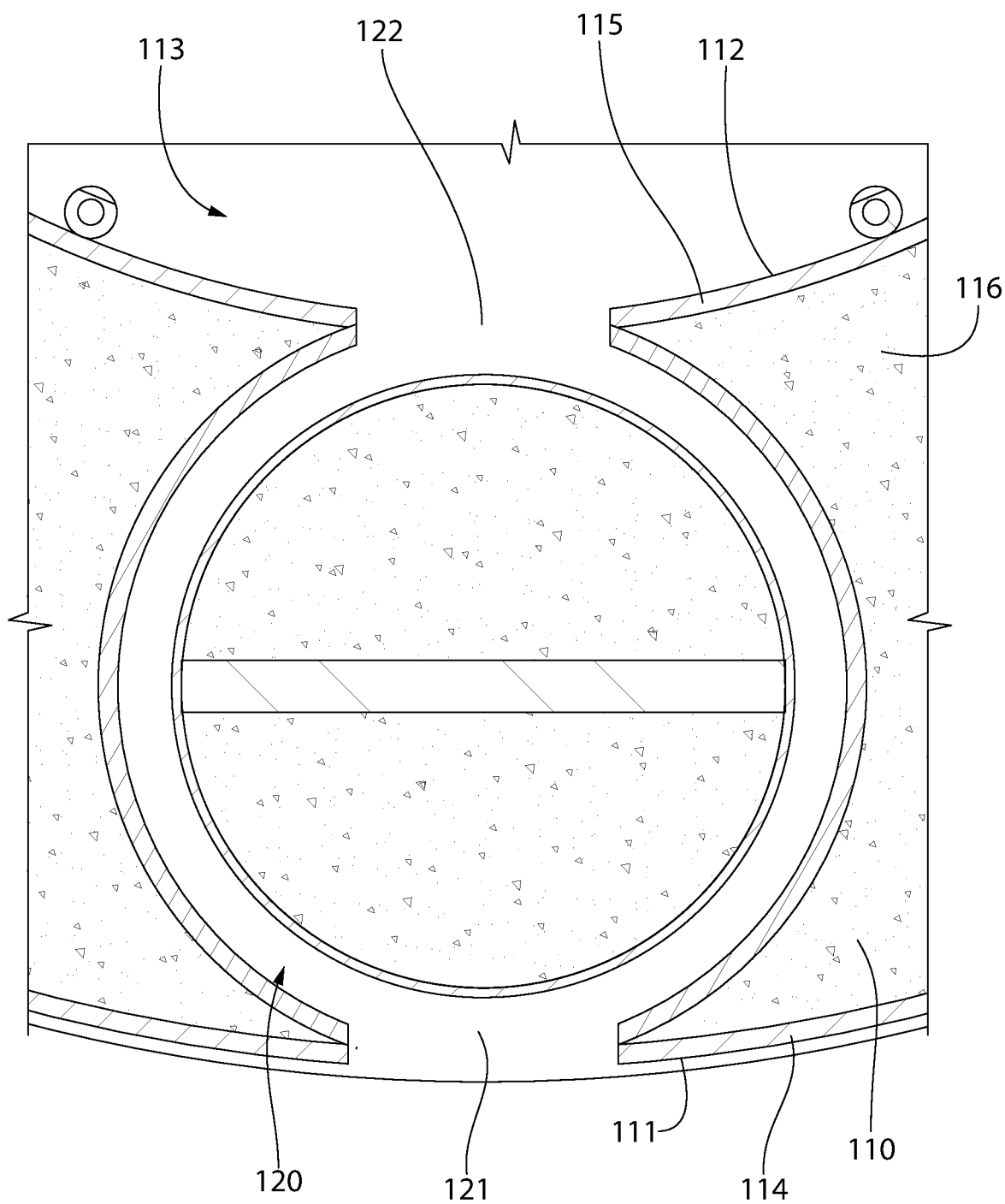
FIG. 3 is a partial cross-sectional view taken along line III-III of FIG. 1.

Referring first to FIGS. 1-3 concurrently, a ventilated system 100 for storing a canister 200 containing high level radioactive waste will be described. The canister 200, which is preferably formed of metal such as stainless steel, is a hermetically sealed container that holds the high level radioactive waste therein. The high level radioactive waste, also referred to as spent nuclear fuel, must be stored for long periods of time until the gamma and neutron radiation emanating therefrom is reduced down to an acceptable level. Until that time, the high level radioactive waste must be stored in various containers, such as the canister 200 and the ventilated system 100, which block or shield the gamma and neutron radiation from streaming into the atmosphere.

The canister 200 forms a fluidic containment boundary about the high level radioactive waste loaded therein. Thus, the canister 200 can be considered a hermetically sealed pressure vessel. The canister 200, however, is thermally conductive so that heat generated by the high level radioactive waste loaded therein is conducted to its outer surface where it can be removed by convection. In one embodiment, the canister 200 is formed of a stainless steel due to its corrosion resistant nature. In other embodiments, the canister 200 can be formed of other metals or metal alloys. Suitable canisters include multi-purpose canisters and, in certain instances, can include thermally conductive casks that are hermetically sealed for the dry storage of high level radioactive waste. Typically, such canisters comprise a honeycomb basket, or other structure, positioned therein to accommodate a plurality of high level radioactive waste rods in spaced relation. An example of a multi-purpose canister that is particularly suited for use in the ventilated system 100 is disclosed in U.S. Pat. No. 5,898,747, issued to Singh on Apr. 27, 1999, the entirety of which is hereby incorporated by reference. Another multi-purpose canister that is particularly suited for use in the ventilated system 100 is disclosed in U.S. Pat. No. 8,135,107, issued to Singh et al. on Mar. 13, 2012, the entirety of which is hereby incorporated by reference.

The canister 200 containing the high level radioactive waste is stored within a ventilated system 100. Specifically, the ventilated system 100 comprises a cask body 110 and a cask lid 130 positioned atop the cask body 110. The cask body 110 comprises an outer surface 111 and an inner surface 112 that defines a storage cavity 113 for holding the canister 200. When the canister 200 is positioned in the storage cavity 113, an annular space exists between the outer surface of the canister 200 and the inner surface 111 of the cask body 110 so that ventilation air can flow through the storage cavity 113 along the outer surface of the canister 200. As will be discussed further below, the ventilation system 100 is configured so that heat generated by the high level radioactive waste causes a natural convective flow of air through a ventilation passageway of the ventilation system 100 (which includes the annular space noted above as well as inlet and outlet ducts described below).

The cask lid 130 is positioned atop the cask body 110 to enclose the open top end of the storage cavity 113. He cask lid 130 is a weldment of steel plates filled with a plain concrete mass that provides neutron and gamma attenuation to minimize skyshine. The cask lid 130 is secured to a top end of the cask body 110 by a plurality of bolts that extend through bolt hole s formed into a lid flange. When secured to the cask body 110, surface contact between the cask lid 130 and the cask body 110 forms a lid-to-body interface. The cask lid 130 is preferably non-fixedly secured to the cask body 110 and encloses the top end of the storage cavity 113 formed by the cask body 110.

The cask body 110 is a rugged, heavy-walled cylindrical vessel that holds the canister 200 therein. In the exemplified embodiment, the cask body 110 comprises an outer shell 114 and an inner shell 115 that are spaced apart from one another. Furthermore, a concrete mass 116 is positioned within the space between the outer and inner shells 114, 115. The main structural function of the cask body 110 is provided by the inner and outer shells, which may be formed from carbon steel or the like, while the main radiation shielding function is provided by the concrete mass. While the principal function of the concrete mass 116 is to provide shielding against gamma and neutron radiation, the concrete mass 116 also helps enhance the performance of the ventilated system 100 in other respects as well. The cask lid 130 has a similar structure with a concrete core and a metal sheath or cover.

The ventilated system 100 comprises a plurality of inlet ducts 120 and at least one outlet duct 125. The inlet ducts 120 are located near a bottom of the cask body 110 to allow ambient air from the atmosphere to flow into the storage cavity 113 at a bottom of the storage cavity 113. In the exemplified embodiment, there are a plurality of the inlet ducts 120 arranged in a circumferentially spaced apart manner along the bottom of the cask body 110. However, in other embodiments there could be just a single continuous inlet duct extending annularly around the circumference of the cask body 110. Furthermore, although the inlet ducts 120 have a specific shape in the exemplified embodiment, the invention is not to be so limited and the inlet ducts 120 may take on other shapes so long as it does not allow radiation to stream therethrough as noted below. Thus, variations and modifications to the inlet ducts 120 are certainly possible and fall within the scope of the invention described and claimed herein.

In the exemplified embodiment, each of the inlet ducts 120 extends from a first opening 121 in the outer surface 111 of the cask body 110 to a second opening 122 in the inner surface 112 of the cask body 110 with the inlet ducts 120 extending continuously from the first opening 121 to the second opening 122. Thus, each of the inlet ducts 120 forms a passageway through the cask body 110 so that ambient air can enter the storage cavity 113 as ventilation air for ventilating the storage cavity 113 and cooling the canister 200 and the high level radioactive waste stored therein over time. As used herein, the term inlet ducts 120 is used to refer to the open space or passageway that extends through the cask body 110, not to the structures that define this open space or passageway. Thus, the inlet ducts 120 are merely open spaces or passageways within a solid structure.

As best seen in FIGS. 2 and 3, in the exemplified embodiment each of the inlet ducts 120 comprises two semi-circular arcuate paths extending from the first opening 121 to the second opening 122. Specifically, there is a cylindrical member 124 located between the first and second openings 121, 122 that defines the shape of the inlet ducts 120. The main purpose of this is to ensure that a clear line of sight does not exist from the second opening 122 to the first opening 121 because if there were a clear line of sight it would be possible for gamma and/or neutron radiation to stream therethrough and into the atmosphere. By creating the inlet ducts 120 with a non-linear path as shown, radiation does not have a clear line path to the atmosphere without contacting and being shielded by a mass of concrete. The exact shape of the inlet ducts 120 is not to be limited to that which is shown in the exemplified embodiment. Thus, the inlet ducts 120 may take on any shape, pattern, or path so long as a clear line of sight does not exist from the storage cavity 113 to the atmosphere through the inlet ducts 120. Thus, the exemplified embodiment is just one of countless possible configurations for the inlet ducts 120. Furthermore, in some embodiments various ones of the inlet ducts 120 may have different configurations or shapes than others of the inlet ducts 120. Thus, while all of the inlet ducts 120 may be identical in some embodiments, this is not required in all embodiments.

In the exemplified embodiment, the outlet duct 125 is formed into the cask lid 130 of the ventilated system 100. The outlet duct 125 has a vertical portion 126 and a horizontal portion 127, which is intended to prevent a clear line of sight from existing through the outlet duct 125 to the atmosphere for the same reasons as described above with regard to the inlet ducts 120. In the exemplified embodiment, the outlet duct 125 is a single, uninterrupted duct extending annularly along the cask lid 130. However, the invention is not to be so limited and the outlet duct 125 could be separated into a plurality of outlet ducts 125. Furthermore, although in the exemplified embodiment the outlet duct 125 is formed into the cask lid 130, the invention is not to be so limited and in other embodiments the outlet duct 125 could be formed into a space between the cask lid 130 and the cask body 110 or the outlet duct 125 could be formed partially or entirely in the cask body 110 rather than or in addition to being formed in the cask lid 130.

FIG. 2 illustrates the flow of air through the storage cavity 113 of the ventilated system 100. When the canister 200 is loaded with high level radioactive waste and positioned within the storage cavity 113, an annular space is formed between an outer surface of the canister 200 and an inner surface of the cask body 110 that forms the storage cavity 113. When so positioned, heat generated by the high level radioactive waste within the canister 200 conducts to the outer surface of the canister 200. This heat then warms the air located within the annular space. As a result of being heated, this warmed air rises within the annular space and eventually exits the ventilated system 100 via the outlet vents 125 as heated air. Due to a thermosiphon effect created by the exiting heated air, cool air is drawn into the inlet vents 125. This cool air flows through the inlet vents 125 and is the drawn upward into the annular space where it becomes heated and begins to rise, thereby creating a continuous cycle, known as the chimney-effect.

Thus, the heat generated by the high level radioactive waste within the canister 200 causes a natural convective flow of air through a ventilation passageway of the ventilated system 100. In the exemplified embodiment, the ventilation passageway is collectively formed by the inlet vents 120, the annular space, and the outlet vents 125. In the exemplified embodiment, the ventilated system 100 is free of forced cooling equipment, such as blowers and closed-loop cooling systems. The rate of air flow through the ventilation passageway of the ventilated system 100 is governed, in part, by the heat generation rate of the high level radioactive waste within the canister 200. The greater the heat generation rate, the greater the natural convective flow of air through the ventilation passageway. Thus, due to the heat generated by the decaying of the high level radioactive waste, a natural convective flow of air into, through, and out of the storage cavity 113 occurs. Cool air enters the storage cavity 113 through the inlet ducts 120, becomes heated and rises as a result, and then exists the storage cavity 113 via the outlet duct 125.

The heat generation rate of the high level radioactive waste decreases/subsides over time due to the passage of time and to the convective cooling described herein. Thus, if no changes are made to the inlet ducts 120 and the outlet duct 125 over time, the rate at which the ventilation air flowing through the storage cavity 113 heats up will decrease. As a result, the surface temperature of the canister 200 will also decrease, which will make the canister 200 prone to stress corrosion cracking or SCC. In some embodiments, the invention is directed to a method of mitigating the risk of stress corrosion cracking in the stainless steel canisters 200 that are stored in the ventilated systems 100 by progressively closing the inlet and/or outlet ducts 120, 125 so that the amount of air entering the storage cavity 113 is reduced and the heating rate of the ventilation air that is flowing through the storage cavity 113 is maintained above a predetermined threshold. The heating rate of the ventilation air is the rate at which the ventilation air heats up as it flows within the storage cavity 113. Thus, for example, the heating rate could have units of ° C./second or ° F./second or the like. Although the method is described herein with reference to a specific structural embodiment of the ventilated system 100, the invention is not to be so limited. The steps described below are applicable to other ventilated systems having other arrangements of inlet and outlet ducts. Thus, the structural embodiment of the ventilated system 100 is provided herein as one example only and there is no intention to limit the invention to the specific structural embodiment shown and described herein.

Each of the inlet ducts 120 has a cross-sectional area which may be constant or may vary depending upon the location at which the cross-sectional area is measured. In some embodiments, the cask body 110 extends along a longitudinal axis A-A and the cross-sectional area described herein may be measured along a plane that is parallel to the longitudinal axis A-A. However, the invention is not to be so limited in all embodiments and it is possible for the cross-sectional area described herein to be measured along a plane that is oblique to the longitudinal axis A-A. However, in preferred embodiments, if the plane upon which the cross-sectional area is measured were a solid object, such plane would completely block air flow through the inlet duct 120. Thus, the plane upon which the cross-sectional area is measured is not perpendicular to the longitudinal axis A-A and does not pass through either of the first and second openings 121, 122 because such plane would not completely block air flow through the inlet duct 120. Whether the cross-sectional area is measured along a plane that is vertical or angled relative to the vertical is not necessarily important so long as it is measured along a plane that, if a solid object, would completely block air flow through the inlet duct 120. In some embodiments, the cross-sectional area described herein may be measured along the first opening 121 of the inlet ducts 120 or along the second opening 122 of the inlet ducts 120, although the cross-sectional area could certainly be measured at other locations along the inlet ducts 120 in other embodiments.

Additionally, in the exemplified embodiment the at least one outlet duct 125 also has a cross-sectional area measured along a plane that, if solid, would completely block air flow through the at least one outlet duct 125. Thus, similar to the cross-sectional area of the inlet ducts 120 described above, for purposes of the invention described herein and the claims, the specific location at which the cross-sectional area of the at least one outlet duct 125 is measured is not to be limiting of the present invention. Rather, the cross-sectional area may be measured at any location and along any plane so long as the plane would completely block air flow through the at least one outlet duct 125.

In the invention described herein, the cross-sectional area of the inlet duct 120 and/or of the at least one outlet duct 125 is reduced over time as a function of the heating rate of the ventilation air and/or a function of the decay of the heat generation rate of the high level radioactive waste to maintain the metal canister 200 above a threshold temperature. Thus, as the heating rate of the ventilation air flowing through the storage cavity 113 decreases, the cross-sectional areas of the inlet ducts 120 and/or of the at least one outlet duct 125 are reduced and possibly eventually closed completely to make sure that the heating rate of the ventilation air is maintained above the predetermined threshold.

As noted above, the inlet ducts 120 and the outlet duct 125 are open spaces or passageways formed into the cask body 110 and/or the cask lid 130. Thus, the cross-sectional area of the inlet ducts 120 and/or the cross-sectional area of the outlet duct 125 can be reduced or decreased by positioning a structure in the inlet ducts 120 and/or the outlet duct 125 that is solid or has solid portions that will block air flow through parts of the inlet and/or outlet ducts 120, 125. Positioning such structures into the inlet ducts 120 and/or the outlet duct 125 will result in a reduction in the cross-sectional area of the inlet duct 120 and/or the outlet duct 125 in which it is positioned, which will reduce the amount of air entering and/or exiting the storage cavity 113, which will facilitate the maintenance of the heating rate of the ventilation air above the predetermined threshold.

Figure 4A:
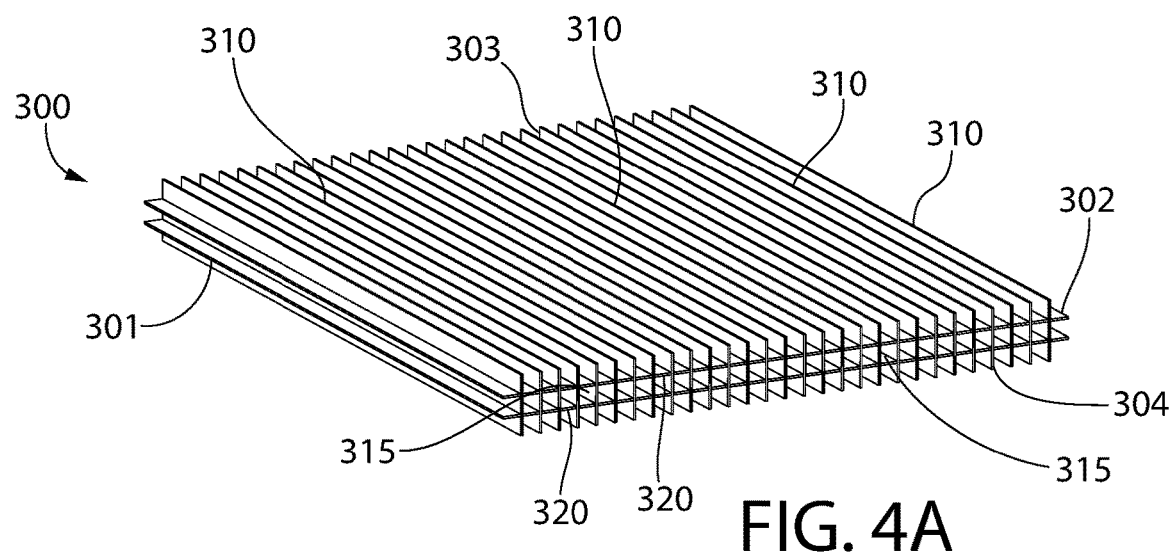
FIGS. 4A-4C illustrate various air flow adjustment members in accordance with an embodiment of the present invention.
Figure 4B:
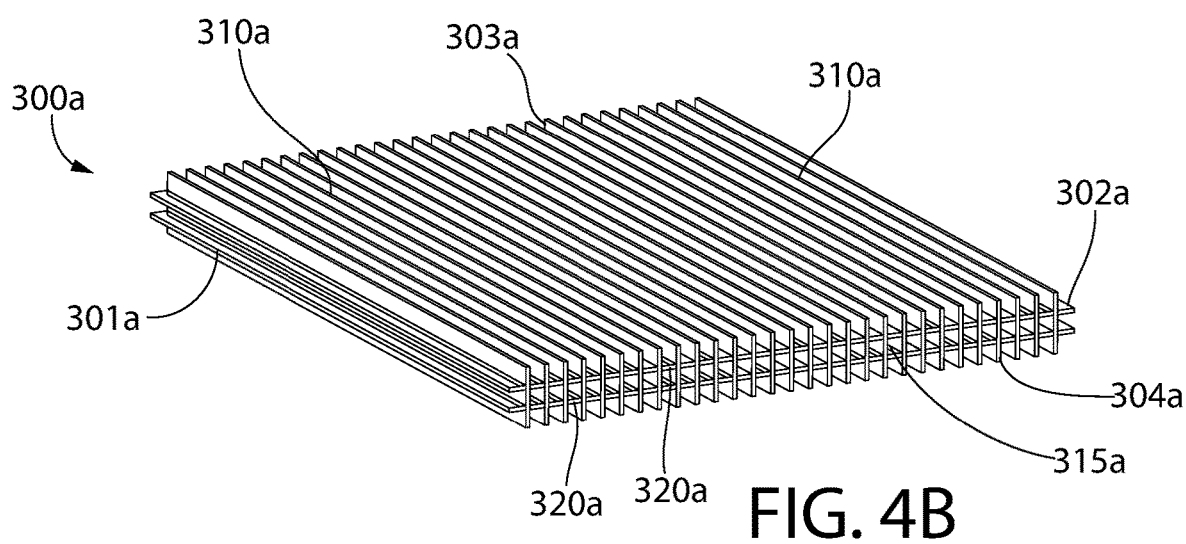
Figure 4C:
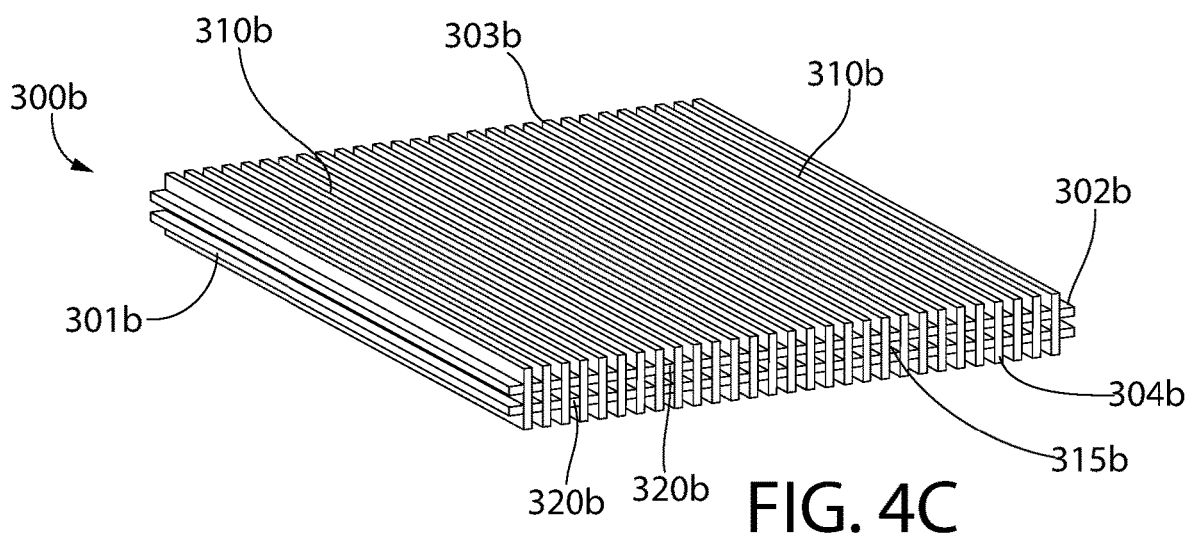

Referring to FIGS. 4A-4C, three different versions of a particular type of air flow adjustment member 300, 300a, 300b are illustrated in accordance with an embodiment of the present invention. The invention is not to be limited by the air flow adjustment members 300, 300a, 300b depicted in FIGS. 4A-4C in all embodiments, but these represent exemplary versions of a structure that can be used to modify the cross-sectional areas of the inlet and/or outlet ducts 120, 125 as described herein.

Referring first to FIG. 4A, the air flow adjustment member 300 comprises a gridwork of plates that form a plurality of open cells 315 that are divided by the plates. Specifically, the air flow adjustment member 300 comprises a plurality of first plates 310 and a plurality of second plates 320. The plurality of first plates 310 and the plurality of second plates 320 may be welded together into a grid like formation. The plurality of first plates 310 are arranged in a spaced apart manner and oriented parallel to one another to form a first set of parallel plates. The plurality of second plates 320 are arranged in a spaced apart manner and oriented parallel to one another to form a second set of parallel plates. In the exemplified embodiment, each of the first plates 310 is oriented orthogonal relative to each of the second plates 320. Thus, the empty spaces bounded by two adjacent ones of the first plates 310 and two adjacent ones of the second plates 320 form the open cells 315. The first and second plates 310, 320 may be formed from sheet steel or other metal materials in various embodiments described herein.

In the exemplified embodiment, the air flow adjustment member 300 is square or rectangular in shape and comprises a first edge 301, a second edge 302, a third edge 303, and a fourth edge 304. Of course, the shape of the air flow adjustment member 300 can be modified as desired so ensure that the air flow adjustment member 300 can fit within the air inlet ducts 120 and/or the air outlet ducts 125. For example, if one of the air inlet ducts 120 has a triangular cross-sectional shape, then the air flow adjustment member designed to fit within that particular air inlet duct may also have a triangular shape. However, correlating the shape of the air flow adjustment member with the shape of the cross-section of the air inlet ducts 120 may not be necessary in all embodiments to achieve the purpose described herein.

As can be appreciated, a cross-sectional area of the air flow adjustment member 300 comprises a plurality of open portions defined by the open spaces 315 and a plurality of closed portions defined by the first and second plates 310, 320. Thus, if the air flow adjustment member 300 were positioned within one of the inlet ducts 120, the air flow adjustment member 300 would reduce the cross-sectional area of the inlet duct 120 when the cross-sectional area is measured along a plane that intersects each of the first, second, third, and fourth edges 301-304 of the air flow adjustment member 300.

FIGS. 4B and 4C illustrate air flow adjustment members 300a, 300b that are identical to the air flow adjustment member 300 except with regard to the thickness of the first and second plates 310, 310a, 310b, 320, 320a, 320b and also with regard to the dimensions of the open portions 315, 315a, 315b. Specifically, the air flow adjustment members 300, 300a, 300b are designed so that the thicker the first and second plates 310, 310a, 310b, 320, 320a, 320b, the smaller the dimensions or cross-sectional area of the open portions 315, 315a, 315b. The air flow adjustment members 300, 300a, 300b are all the same overall size, the only difference being that the air flow adjustment member 300a uses first and second plates 310a, 320a that are thicker than the first and second plates 310, 320 of the air flow adjustment member 300 and the air flow adjustment member 300b uses first and second plates 310b, 320b that are thicker than the plates 310a, 320a of the air flow adjustment member 300a. Thus, the open portions 315b of the air flow adjustment member 300b is larger than the open portions 315a of the air flow adjustment member 300a, which are larger than the open portions 315 of the air flow adjustment member 300. Thus, if there is a need/desire to reduce the cross-sectional area of one of the inlet ducts 320 or the outlet duct 325 by a small amount/percentage, then the air flow adjustment member 300 may be used. However, if there is a need/desire to reduce the cross-sectional area of one of the inlet ducts 320 or the outlet duct 325 by a larger amount/percentage, than the air flow adjustment member 300a or the air flow adjustment member 300b may be used. This will be described in greater detail below with reference to FIGS. 5A-7B.

As noted above, the invention may be directed to a method of storing high level radioactive waste and controlling/regulating the heating rate of the ventilation air flowing through the storage cavity 113 (and therefore also controlling the temperature of the canister 200 in the storage cavity 113). This may be achieved, in some embodiments, by positioning the air flow adjustment members 300, 300a, 300b in one or more of the inlet ducts 120 and/or in the outlet duct 125. In fact, in some embodiments this may be done in a progressive manner to progressively reduce the cross-sectional area of one or more of the inlet ducts 120 and/or the outlet duct 125 over time. Specifically, as more time passes, it may be necessary to continue to reduce the cross-sectional area of the one or more inlet ducts 120 and/or the outlet duct 125. Thus, when the high level radioactive waste is first placed in the canister 200 and the canister 200 placed in the storage cavity 113, there may not be any of the air flow adjustment members 300, 300a, 300b used. However, at time T1 after the initial storage date, it may be determined that the heating rate of the ventilation air and the temperature of the canister 200 has decreased below a predetermined threshold such that the canister 200 is at risk of stress corrosion cracking. At such time T1, one of the air flow adjustment members 300 may be positioned within one or more of the inlet ducts 120 and/or in the air outlet duct 125.

Then, at a time T2 that is after the time T1, it may once again be determined that the heating rate of the ventilation air and the temperature of the canister 200 has decreased below the predetermined threshold such that the canister 200 is again at risk of stress corrosion cracking. This might occur despite the fact that the air flow adjustment member 300 is located within one or more of the inlet ducts 120 and/or the outlet duct 125. At such time, if some of the inlet ducts 120 and/or the outlet duct 125 still do not have one of the air flow adjustment members 300 therein, then the air flow adjustment members 300 can at that time be positioned within those inlet ducts 120 and/or outlet duct 125. However, if at that time T2 all of the inlet ducts 120 and/or the outlet duct 125 already have one of the air flow adjustment members 300 positioned therein, then for at least one or more of the inlet ducts 120 and/or the outlet duct 125, the air flow adjustment member 300 may be removed and replaced with one of the air flow adjustment members 300a.

In some embodiments, calculations may be made using computational fluid dynamics to determine the amount or percentage that the cross-sectional areas of the inlet ducts 120 and/or the outlet duct 125 should be reduced in order to maintain the heating rate and/or the canister 200 temperature above the threshold while also ensuring that there is sufficient air flow through the storage cavity 113 to prevent an overheating situation. After such calculations are performed, an air flow adjustment member may be designed and created such that when it is positioned within one of the inlet ducts 120 (or a plurality of them are positioned in different ones of the inlet ducts 120 and/or the outlet duct 125), the cross-sectional area of the inlet and/or outlet ducts 120, 125 is decreased the desired amount to ensure that the heating rate of the ventilation air (or the temperature of the canister 200) is maintained above the threshold. In some embodiments, modifications to the cross-sectional areas of the inlet and/or outlet ducts 120, 125 are done to ensure that the temperature of the canister 200 stays above 85° C.

In some embodiments, the inlet ducts 120 may have a combined cross-sectional area and the reduction in the cross-sectional area described herein may be done on the basis of the combined cross-sectional area of all of the inlet ducts 120 rather than on the basis of the individual cross-sectional areas of each of the inlet ducts 120. For example, it may be determined that the combined cross-sectional area of all of the inlet ducts 120 should be reduced by 5% in order to ensure that the heating rate of the ventilation air and the temperature of the canister 200 remain above their respective predetermined thresholds to prevent stress corrosion cracking of the canister 200. If there are ten inlet ducts 120 each having an identical cross-sectional area, then the 5% reduction in the combined cross-sectional area may be achieved by reducing the cross-sectional area of just one of the inlet ducts 120 by 50%. Alternatively, each of the inlet ducts 120 may have its cross-sectional area reduced by 5%, or five of the ten air inlet ducts 120 may have their cross-sectional areas reduced by 10%. Thus, as can be seen, there is an infinite amount of variation that can be used to achieve the desired results.

In some embodiments, the concept involves progressively reducing the combined cross-sectional area of all of the inlet ducts 120 over time, which may involve progressively reducing the cross-sectional area of one of the inlet ducts 120 over time, may involve progressively reducing the cross-sectional area of all of the inlet ducts 120 over time, or may involve progressively reducing the cross-sectional areas of several, but not all, of the inlet ducts 120 over time, or may involve progressively reducing the cross-sectional area of the inlet duct 125 over time. In some embodiments, the cross-sectional area of the inlet ducts 120 and/or the outlet ducts 125 are only reduced over time, but never later increased. However, in other embodiments it may be necessary to increase the cross-sectional areas of the inlet and/or outlet ducts 120, 125 at a later time. For example, ambient temperatures play a role in the heating rate of the ventilation air and the temperature of the canister 200. Thus, if the ambient temperature gets too high for an extended period of time, it may be necessary to increase the cross-sectional area of the inlet and/or outlet ducts 120, 125 to prevent overheating.

Figure 5A:
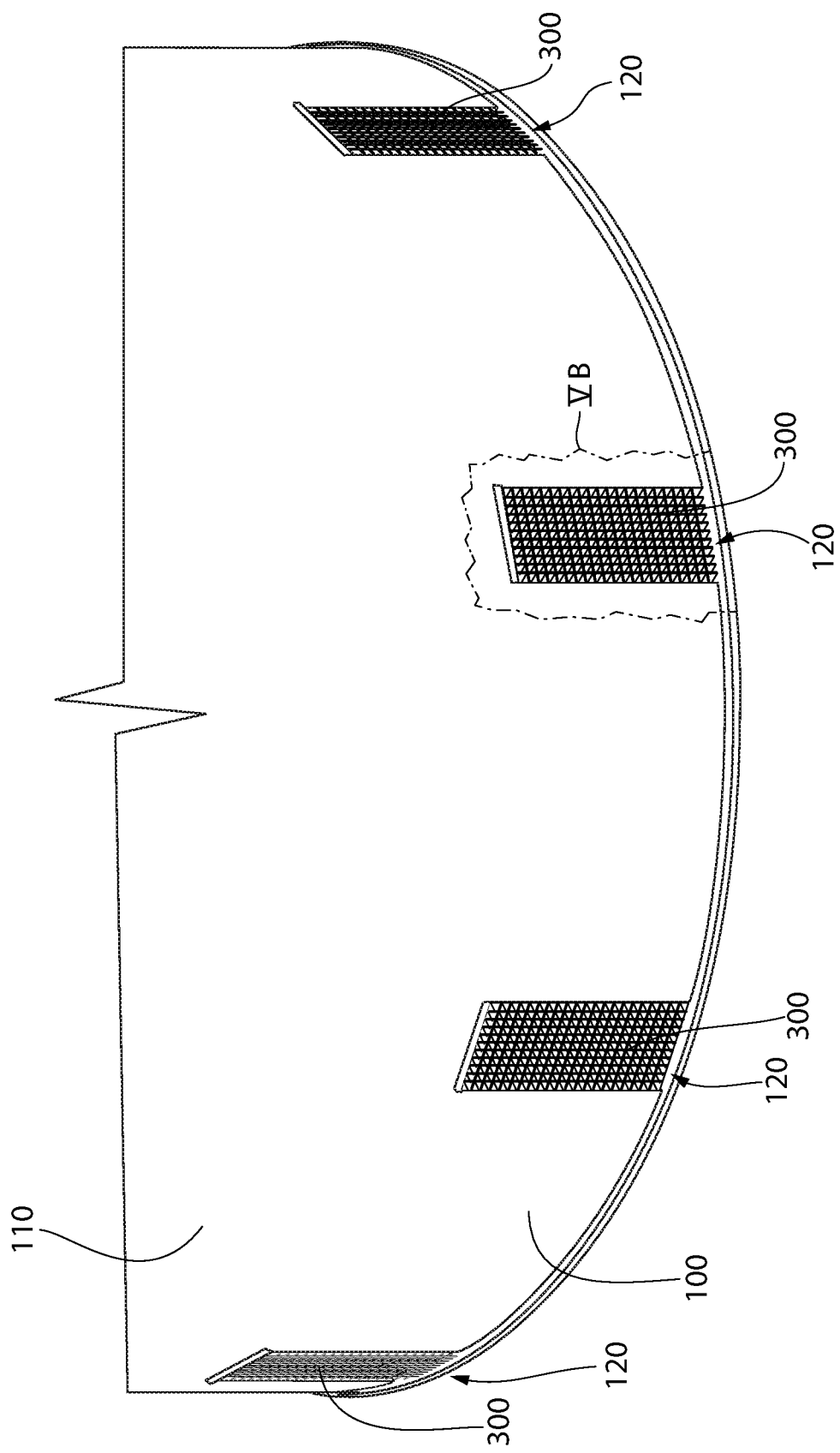
FIG. 5A illustrates a lower portion of the ventilated system of FIG. 1 with a first type of air flow adjustment member in inlet ducts thereof.
Figure 5B:
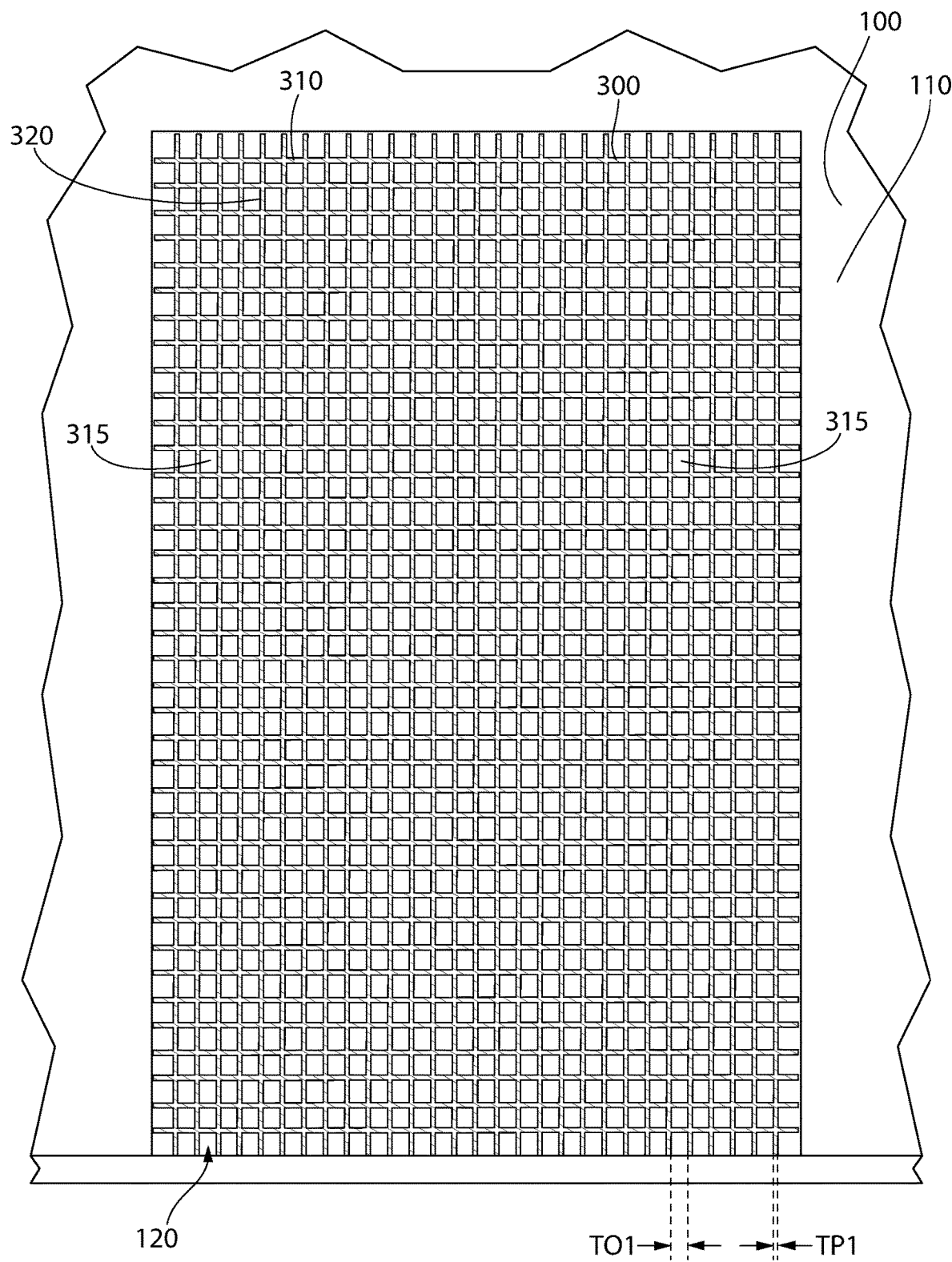
FIG. 5B is a close-up view of area VB of FIG. 5A.

Referring to FIGS. 5A and 5B, an embodiment is illustrated wherein one of the air flow adjustment members 300 is positioned within each of the inlet ducts 120 to reduce the combined cross-sectional area of the plurality of inlet ducts 120. Of course, as noted above the air flow adjustment member 300 may be positioned in just one of the inlet ducts 120 or more than one but less than all of the plurality of inlet ducts 120 in some embodiments. Furthermore, although in FIGS. 5A and 5B the same air flow adjustment member 300 is positioned within each of the inlet ducts 120, in other embodiments different ones of the air flow adjustment members 300, 300a, 300b (and others not specifically depicted herein) may be positioned within different ones of the plurality of inlet ducts 120 as desired or needed to achieve the proper reduction in the combined cross-sectional area of the plurality of inlet ducts 120.

In FIG. 5B, the air flow adjustment member 300 is depicted with hatching to indicate that the illustration includes a cross-sectional view of the inlet duct 120 at a location at which the air flow adjustment member 300 is positioned. As noted previously, the plurality of first plates 310 and the plurality of second plates 320 collectively define a plurality of open cells or open cell portions 315 of the air flow adjustment member 300. Each of the plates 310, 320 has a thickness TP1 and each of the open cells 315 has a thickness TO1. In this particular embodiment, the thickness TO1 of the open cells 315 is greater than the thickness TP1 of the plates 310, 320. Although in the exemplified embodiment each of the plates 310, 320 has the same thickness TP1 and each of the open cells 315 has the same thickness TO1 and cross-sectional area, this is not required in all embodiments. The thicknesses of the plates 310, 320 and the open cells 315 and the cross-sectional area of the open cells 315 may be varied within a single air flow adjustment member 300 in other embodiments.

With the air flow adjustment member 300 positioned within one of the inlet ducts 120 as shown, air can flow through the open cells 315 but is prevented from flowing through the other portions of the inlet duct 120 (i.e., through the plates 310, 320). Each of the open cells 315 has a cross-sectional area. When the air flow adjustment member 300 is positioned within one of the inlet ducts 120, the sum of the cross-sectional areas of the open cells 315 forms the reduced cross-sectional area of the inlet duct 120. Specifically, if the air flow adjustment member 300 were removed, the inlet duct 120 would have a cross-sectional area equal to a length of opening times a width of the opening. With the air flow adjustment member 300 positioned in the inlet duct 120, the cross-sectional area is the sum of the cross-sectional area of the open cells 315, which is less than the cross-sectional area of the inlet duct 120 without the air flow adjustment member 300 therein. Thus, positioning the air flow adjustment member 300 into one, or multiple, of the inlet ducts 120 will reduce the cross-sectional area of that particular inlet duct 120 and also reduce the combined cross-sectional area of all of the inlet ducts 120.

Figure 6A:
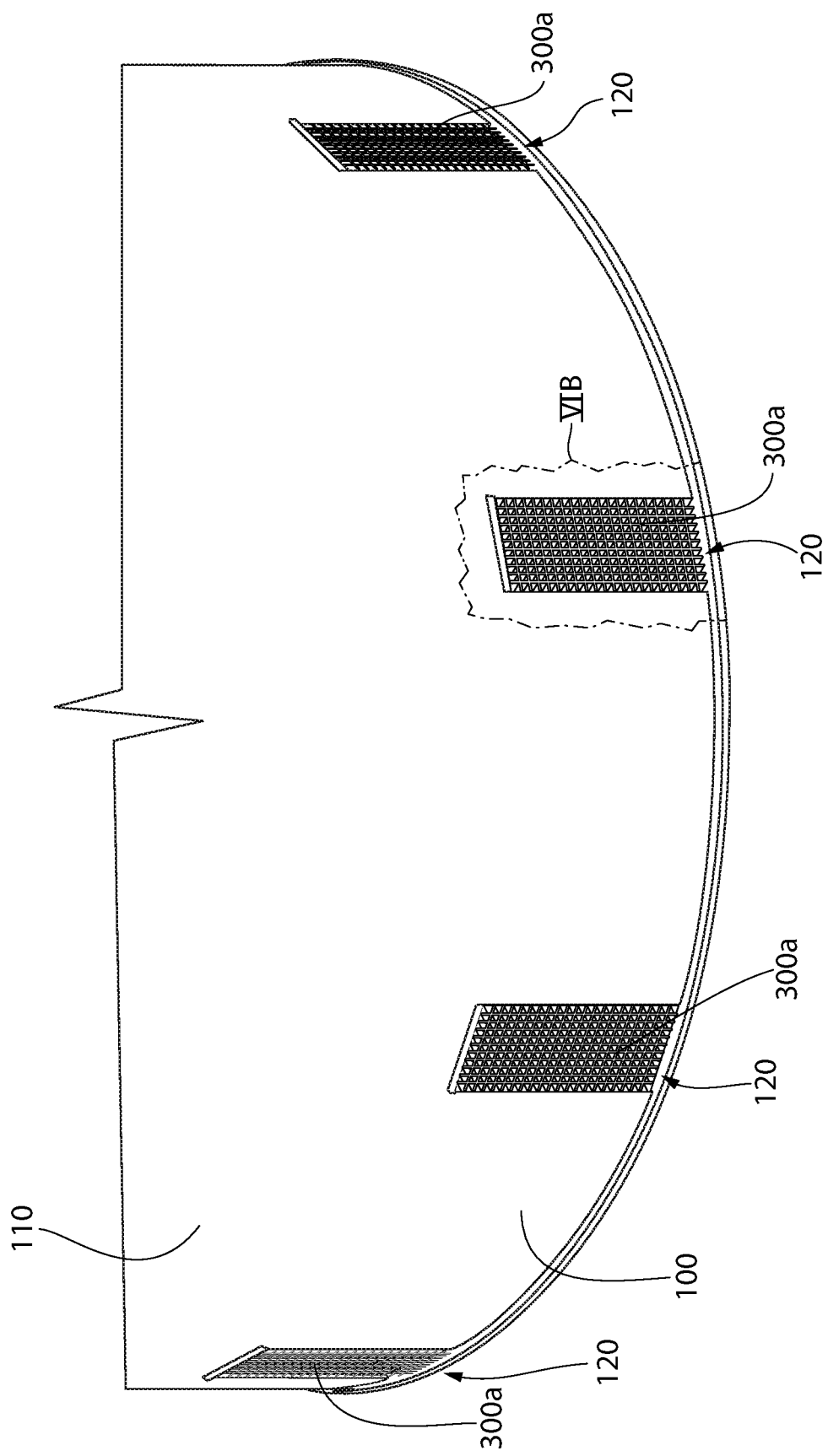
FIG. 6A illustrates a lower portion of the ventilated system of FIG. 1 with a second type of air flow adjustment member in inlet ducts thereof.
Figure 6B:
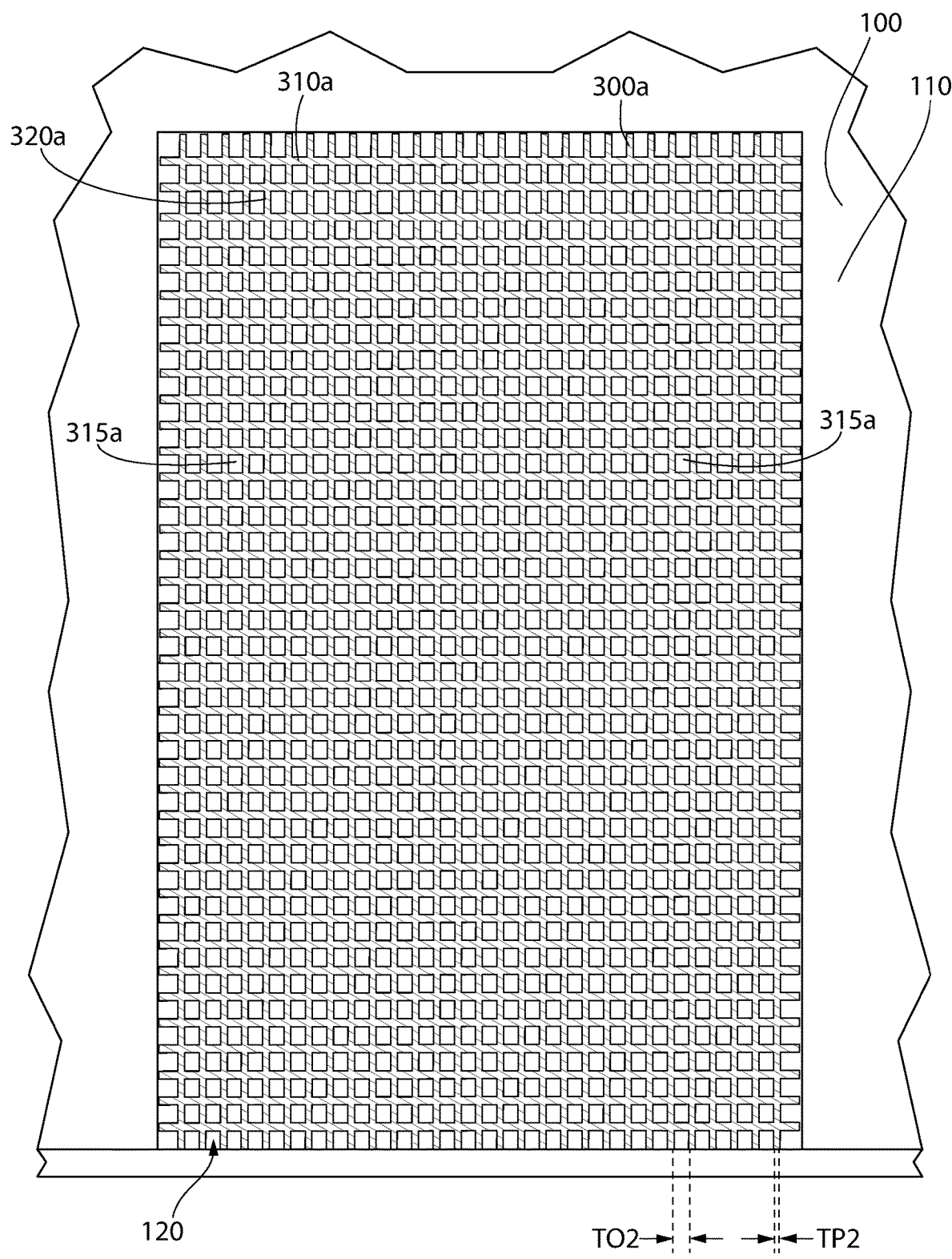
FIG. 6B is a close-up view of area VIB of FIG. 6A.

Referring to FIGS. 6A and 6B, an embodiment is illustrated wherein one of the air flow adjustment members 300a is positioned within each of the inlet ducts 120 to reduce the combined cross-sectional area of the plurality of inlet ducts 120. Again, although one of the air flow adjustment members 300a is positioned within each of the inlet ducts 120 in the exemplified embodiment, this is not required in all embodiments. Rather, one of the air flow adjustment members 300a may be positioned in one or more of the inlet ducts 120 while others of the inlet ducts 120 are completely open and free of an air flow adjustment member therein, or where different types of air flow adjustment members (such as the air flow adjustment members 300, 300b) are positioned in others of the inlet ducts 120.

In FIG. 6B, the air flow adjustment member 300a is depicted in cross-section to indicate that the illustration includes a cross-sectional view of the inlet duct 120 at a location at which the air flow adjustment member 300a is positioned. As noted previously, the plurality of first plates 310a and the plurality of second plates 320a collectively define a plurality of open cells or open cell portions 315a of the air flow adjustment member 300a. Each of the plates 310a, 320a has a thickness TP2 and each of the open cells 315a has a thickness TO2 and a cross-sectional area. For comparison with the air flow adjustment member 300, the thickness TP2 of the plates 310a, 320a is greater than the thickness TP1 of the plates 310, 320 and thus the thickness TO2 (and cross-sectional area) of the open cells 315a is less than the thickness TO1 (and cross-sectional area) of the open cells 315. Although in the exemplified embodiment each of the plates 310a, 320a has the same thickness TP2 and each of the open cells 315a has the same thickness TO2 and cross-sectional area, this is not required in all embodiments. The thicknesses of the plates 310a, 320a and the open cells 315a may be varied in other embodiments.

With the air flow adjustment member 300a positioned within one of the inlet ducts 120 as shown, air can flow through the open cells 315a but is prevented from flowing through the other portions of the inlet duct 120 (i.e., through the plates 310a, 320a). Each of the open cells 315a has a cross-sectional area. When the air flow adjustment member 300a is positioned within one of the inlet ducts 120, the sum of the cross-sectional areas of the open cells 315a forms the reduced cross-sectional area of the inlet duct 120. Specifically, if the air flow adjustment member 300a were removed, the inlet duct 120 would have a cross-sectional area equal to a length of opening times a width of the opening. With the air flow adjustment member 300a positioned in the inlet duct 120, the cross-sectional area is the sum of the cross-sectional area of the open cells 315a, which is less than the cross-sectional area of the inlet duct 120 without the air flow adjustment member 300a therein. Thus, positioning the air flow adjustment member 300 into one, or multiple, of the inlet ducts 120 will reduce the cross-sectional area of that particular inlet duct 120 and also reduce the combined cross-sectional area of all of the inlet ducts 120.

Figure 7A:
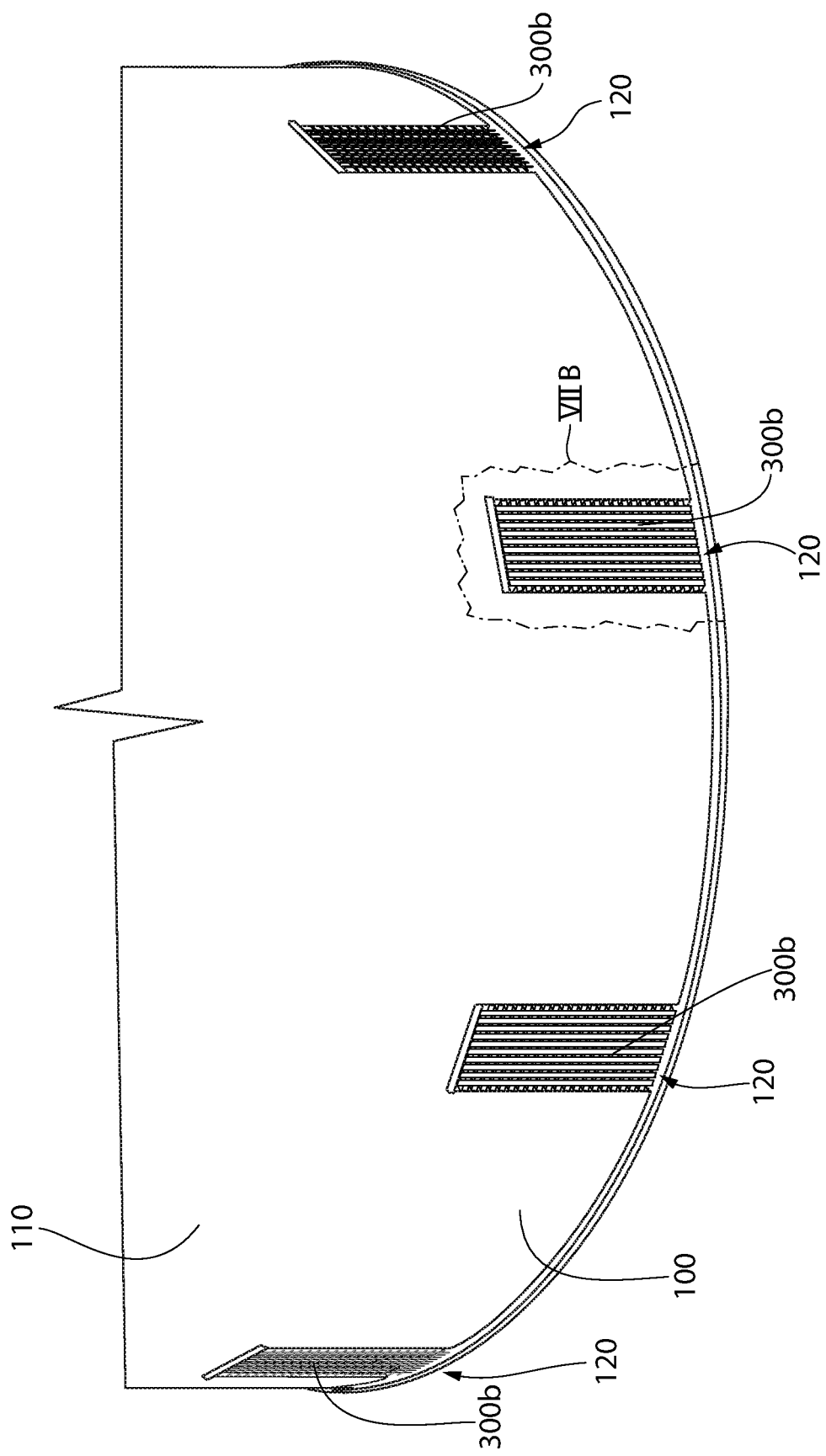
FIG. 7A illustrates a lower portion of the ventilated system of FIG. 1 with a third type of air flow adjustment member in inlet ducts thereof.
Figure 7B:
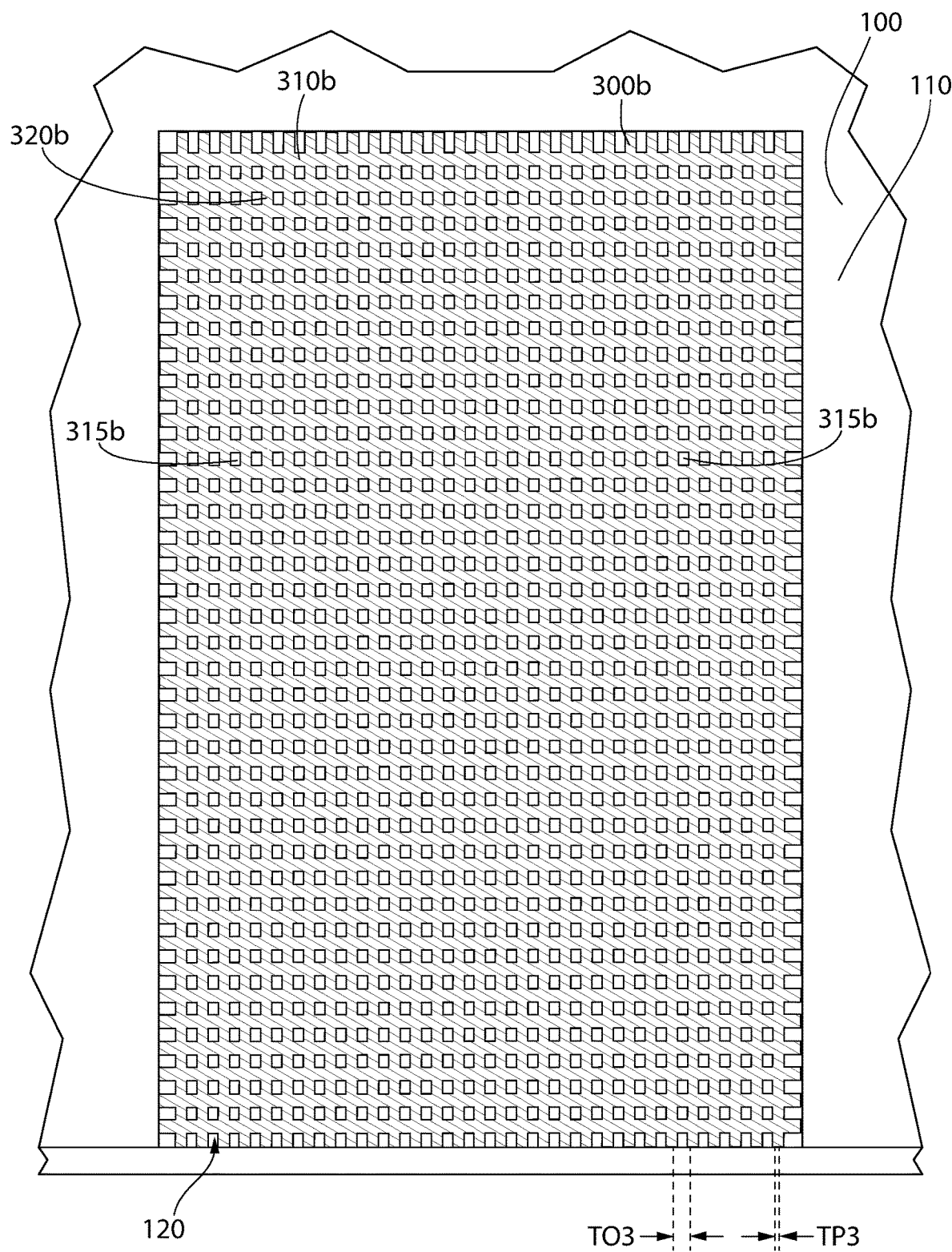
FIG. 7B is a close-up view of area VIIB of FIG. 7A.

In FIGS. 7A and 7B, an embodiment is illustrated wherein one of the air flow adjustment members 300b is positioned within each of the inlet ducts 120 to reduce the combined cross-sectional area of the plurality of inlet ducts 120. FIGS. 7A and 7B illustrate the same thing as FIGS. 5A and 5B and FIGS. 6A and 6B, except utilizing the air flow adjustment member 300b. Thus, the description of FIGS. 5A-6B above is applicable, except for the differences noted here.

In FIG. 7B, the air flow adjustment member 300b is depicted in cross-section to indicate that the illustration includes a cross-sectional view of the inlet duct 120 at a location at which the air flow adjustment member 300b is positioned. As noted previously, the plurality of first plates 310b and the plurality of second plates 320b collectively define a plurality of open cells or open cell portions 315b of the air flow adjustment member 300b. Each of the plates 310b, 320b has a thickness TP3 and each of the open cells 315b has a thickness TO3 and a cross-sectional area. For comparison with the air flow adjustment member 300a, the thickness TP3 of the plates 310b, 320b is greater than the thickness TP2 of the plates 310a, 320a and thus the thickness TO3 (and the cross-sectional area) of the open cells 315b is less than the thickness TO2 (and the cross-sectional area) of the open cells 315a. Although in the exemplified embodiment each of the plates 310b, 320b has the same thickness TP3 and each of the open cells 315b has the same thickness TO3, this is not required in all embodiments. The thicknesses of the plates 310b, 320b and the open cells 315b may be varied in other embodiments.

The combined cross-sectional area of the open cells 315b of the air flow adjustment member 300b is less than the combined cross-sectional area of the open cells 315a of the air flow adjustment member 300a, which is less than the combined cross-sectional area of the open cells 315 of the air flow adjustment member 300. This is achieved in the exemplified embodiment by making the plates 310b, 320b thicker than the plates 310a, 320a, which are thicker than the plates 310, 320. This could also be achieved by utilizing more plates while maintaining the air flow adjustment members with the same overall dimensions such that the plates are positioned more closely together. Thus, if at time T1 the air flow adjustment member 300 is positioned in one of the inlet ducts 120, the cross-sectional area of the inlet duct 120 will be reduced a first percentage. If at time T2 the air flow adjustment member 300a is positioned in one of the inlet ducts 120, the cross-sectional area of the inlet duct 120 will be reduced a second percentage that is greater than the first percentage. If at time T3 the air flow adjustment member 300b is positioned in one of the inlet ducts 120, the cross-sectional area of the inlet duct 120 will be reduced a third percentage that is greater than the second percentage. Therefore, first positioning the air flow adjustment member 300 in one of the inlet ducts 120 and then later swapping the air flow adjustment member 300 for one of the air flow adjustment members 300a and then still later swapping the air flow adjustment member 300a for one of the air flow adjustment members 300b will result in a progressive reduction in the cross-sectional area of the inlet duct 120 over time. Furthermore, even if just one of the inlet ducts 120 goes through the progression of having the air flow adjustment members 300, 300a, 300b positioned therein sequentially over time while the other inlet ducts 120 remain open and free of any air flow adjustment members therein, the combined cross-sectional area of the plurality of inlet ducts 120 will be reduced in a progressive manner.

Figure 8A:
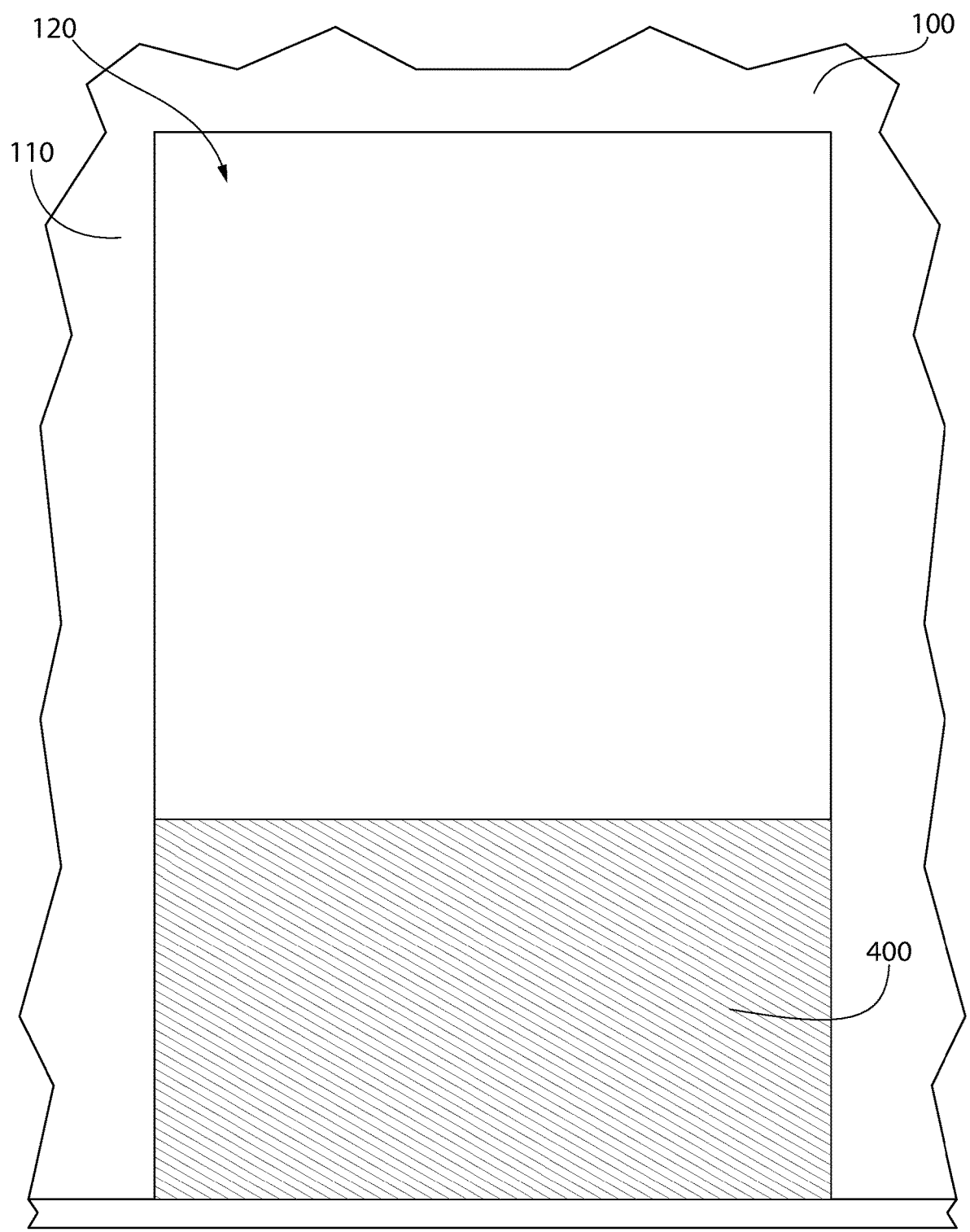
FIG. 8A is a close-up view of area VIIB of FIG. 7A in accordance with a first alternative embodiment of the present invention.
Figure 8B:
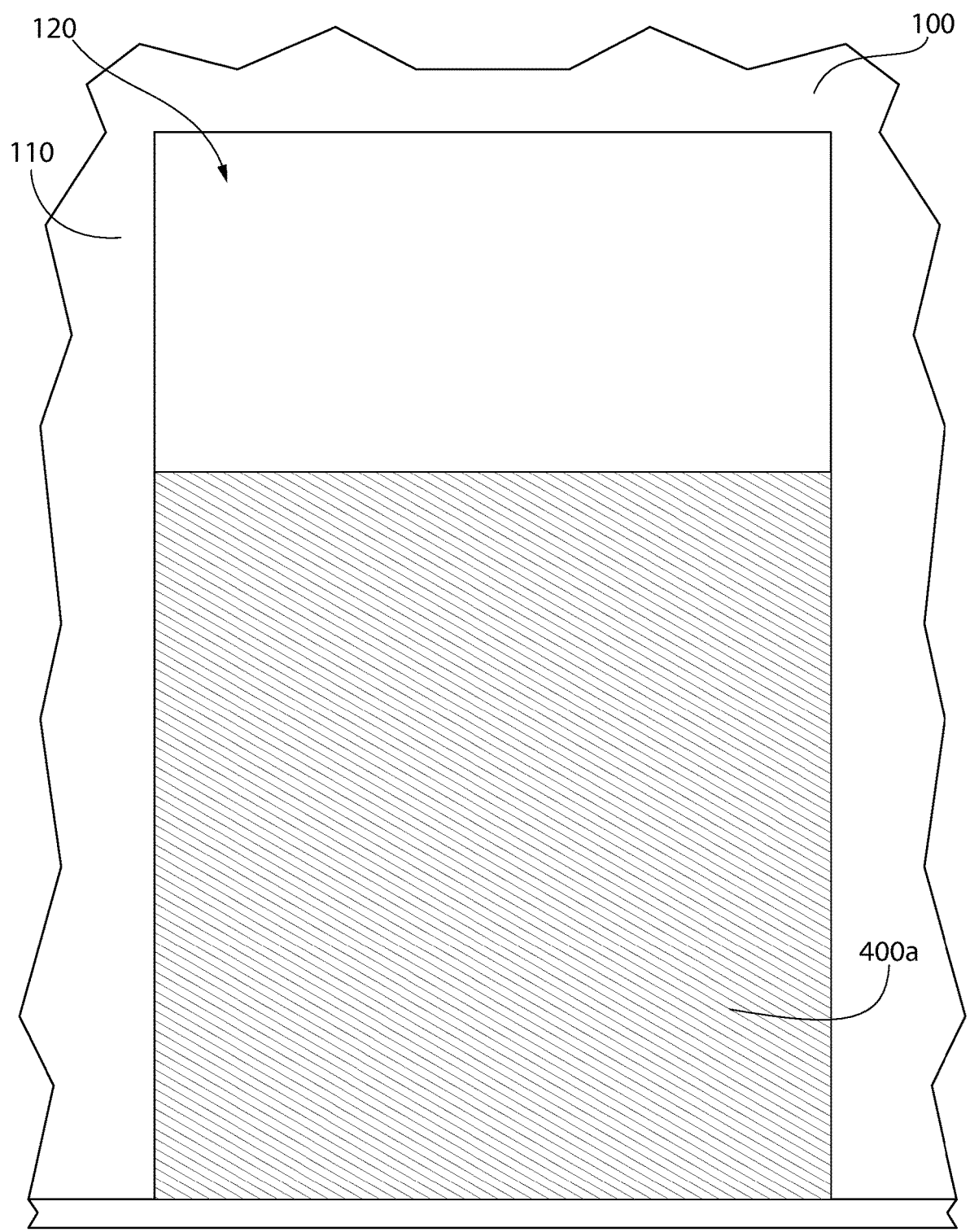
FIG. 8B is a close-up view of area VIIIB of FIG. 7A in accordance with a second alternative embodiment of the present invention.

Referring to FIGS. 8A and 8B, alternative air flow adjustment members 400, 400a are illustrated positioned in one of the inlet ducts 120. In the embodiment of FIG. 8A, the air flow adjustment member 400 is a solid plate having a height that is less than a height of the inlet duct 120. Thus, the air flow adjustment member 400 completely blocks or closes a bottom portion of the inlet duct 120 while leaving a top portion of the inlet duct 120 completely open. Of course, the air flow adjustment member 400 could just as easily block the top portion of the inlet duct 120 while leaving the bottom portion of the inlet duct 120 open. In other embodiments, the air flow adjustment member 400 may have a height that is equal to the height of the inlet duct 120 while having a width that is less than the width of the inlet duct 120 to achieve the same effect. The exact height and/or width of the air flow adjustment member 400 may be modified as desired or necessary to ensure that when it is positioned within the inlet duct(s) 120 the heating rate of the ventilation air is maintained at or above the predetermined threshold required to ensure that stress corrosion cracking of the canister 200 is prevented.

FIG. 8B illustrates the air flow adjustment member 400a positioned in the inlet duct 120. The air flow adjustment member 400a is a solid plate having a height that is greater than the height of the air flow adjustment member 400 but less than the height of the inlet duct 120. Thus, the air flow adjustment member 400a reduces the cross-sectional area of the inlet duct 120 a greater percentage or amount than does the air flow adjustment member 400. Similar to the description of the air flow adjustment members 300, 300a, 300b, the air flow adjustment members 400, 400a can be used to progressively decrease the cross-sectional areas of the inlet ducts 120.

Figure 9:
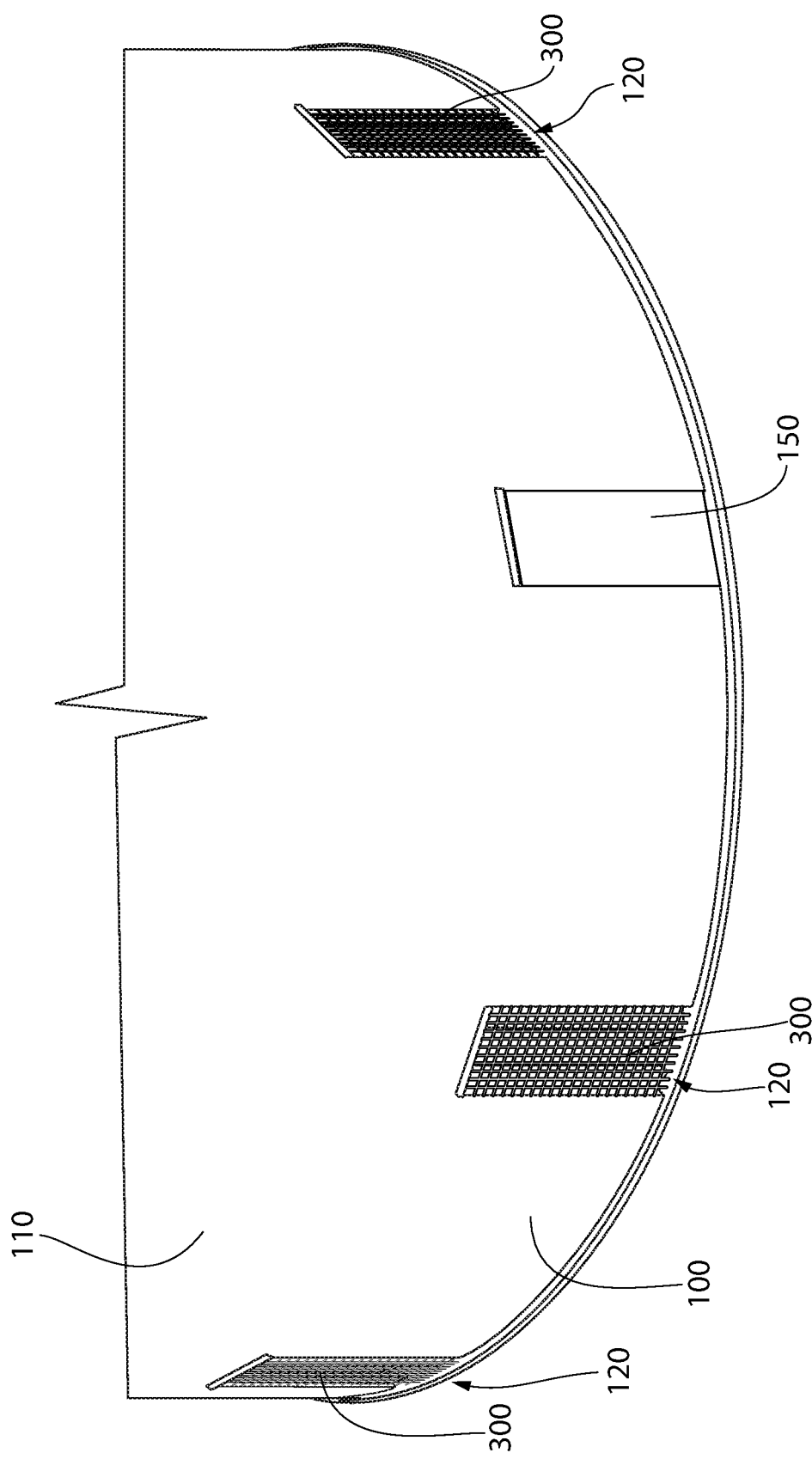
FIG. 9 illustrates a lower portion of the ventilated system of FIG. 1 with one of the inlet ducts thereof completely closed.

FIG. 9 illustrates an embodiment whereby one of the air flow adjustment members 300, 300a, 300b is positioned within several of the inlet ducts 120 and another one of the inlet ducts 120 is completely closed by blocking the opening into the inlet duct 120 with a plate member 150. In cold ambient temperatures and after many years of decay, it may be necessary to begin completing closing some of the inlet ducts 120 to ensure that the heating rate of the ventilation air and the temperature of the canister 200 remains above the desired threshold level to prevent stress corrosion cracking. Thus, as time continues to pass, more than one of the inlet ducts 120 may be blocked with one of the plate members 150. It is entirely conceivable that all of the inlet ducts 125 may eventually be capped. Furthermore, in some embodiments the outlet duct 125 may also eventually be capped. After the need for ventilation no longer exists, it may be prudent to fill the annular gap between the canister 200 and the inner surface 111 of the cask body 110 with inert gas (e.g., nitrogen) to permanently banish the specter of SCC and hermetically seal the storage cavity 113 of the cask body 110.

Figure 10:
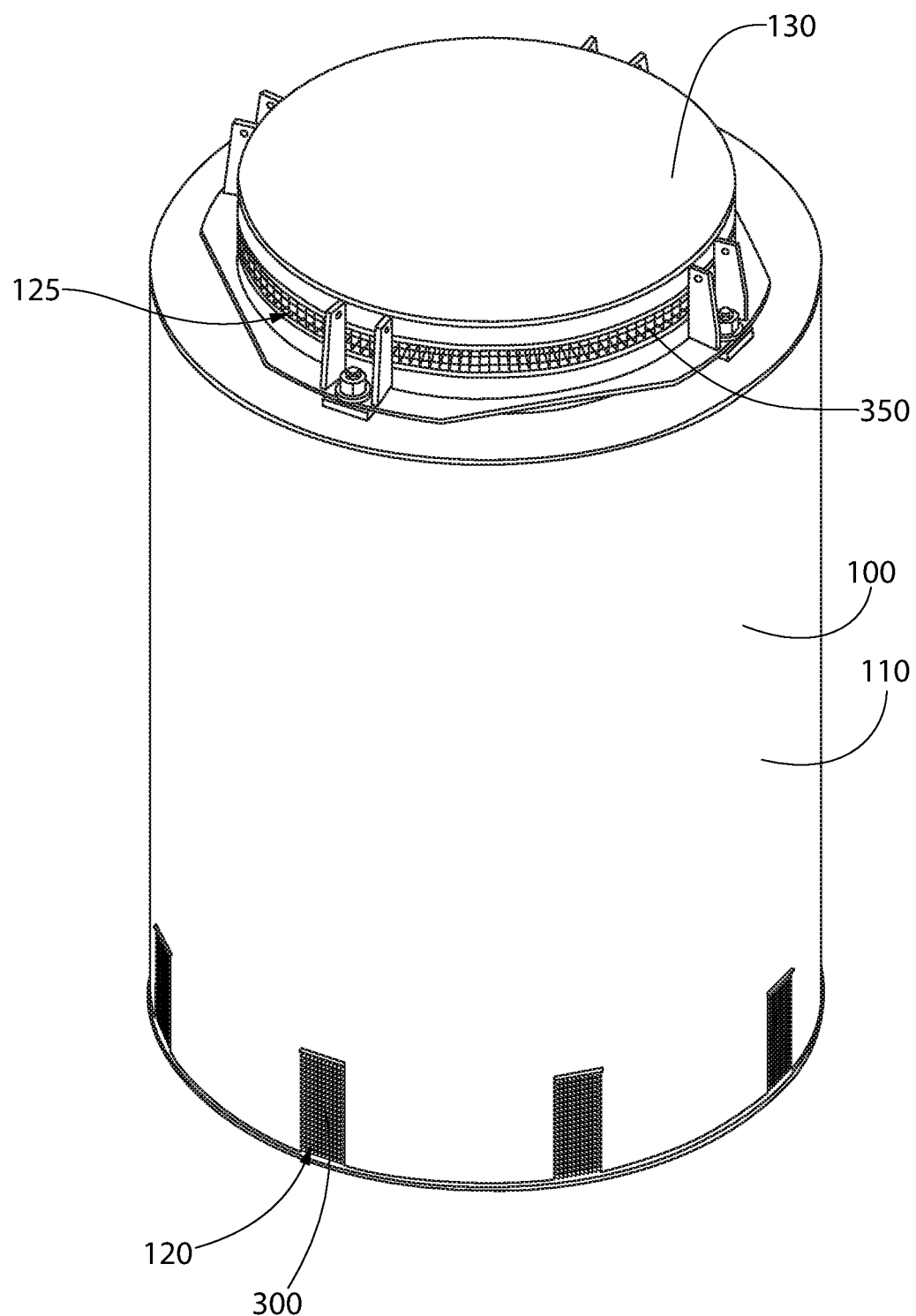
FIG. 10 is a perspective view of the ventilated system of FIG. 1 with air flow adjustment members in the inlet and outlet ducts thereof.

Referring to FIG. 10, the ventilated system 100 is illustrated with various air flow adjustment members 300, 300a, 300b positioned in all of the inlet ducts 120 and an air flow adjustment member 350 positioned in the outlet duct 125. The main purpose of this figure is to illustrate that an air flow adjustment member 350 may be positioned in the outlet duct 125 in addition to being positioned in the inlet ducts(s) 120. In fact, in some embodiments and depending on external factors, it may be desirable at certain times to position one of the air flow adjustment members 350 in the outlet duct 125 without having any air flow adjustment members 300, 300a, 300b in the inlet ducts 120. Although it is intuitively apparent that the partially or entirely blocking of the inlet ducts 120 would be more effective at maintaining the heating rate of the ventilation air above the predetermined lower threshold, it should be appreciated that adjusting the flow area in both the inlet and outlet ducts 120, 125 can be employed to maintain the outer surface of the canister 200 at a desired temperature in order to control, mitigate, and/or prevent stress corrosion cracking. Just as with the air flow adjustment members 300, 300a, 300b, there may be several different versions of the air flow adjustment member 350 for purposes of reducing the cross-sectional area of the outlet duct 125 varying amounts/percentages.

Figure 11:
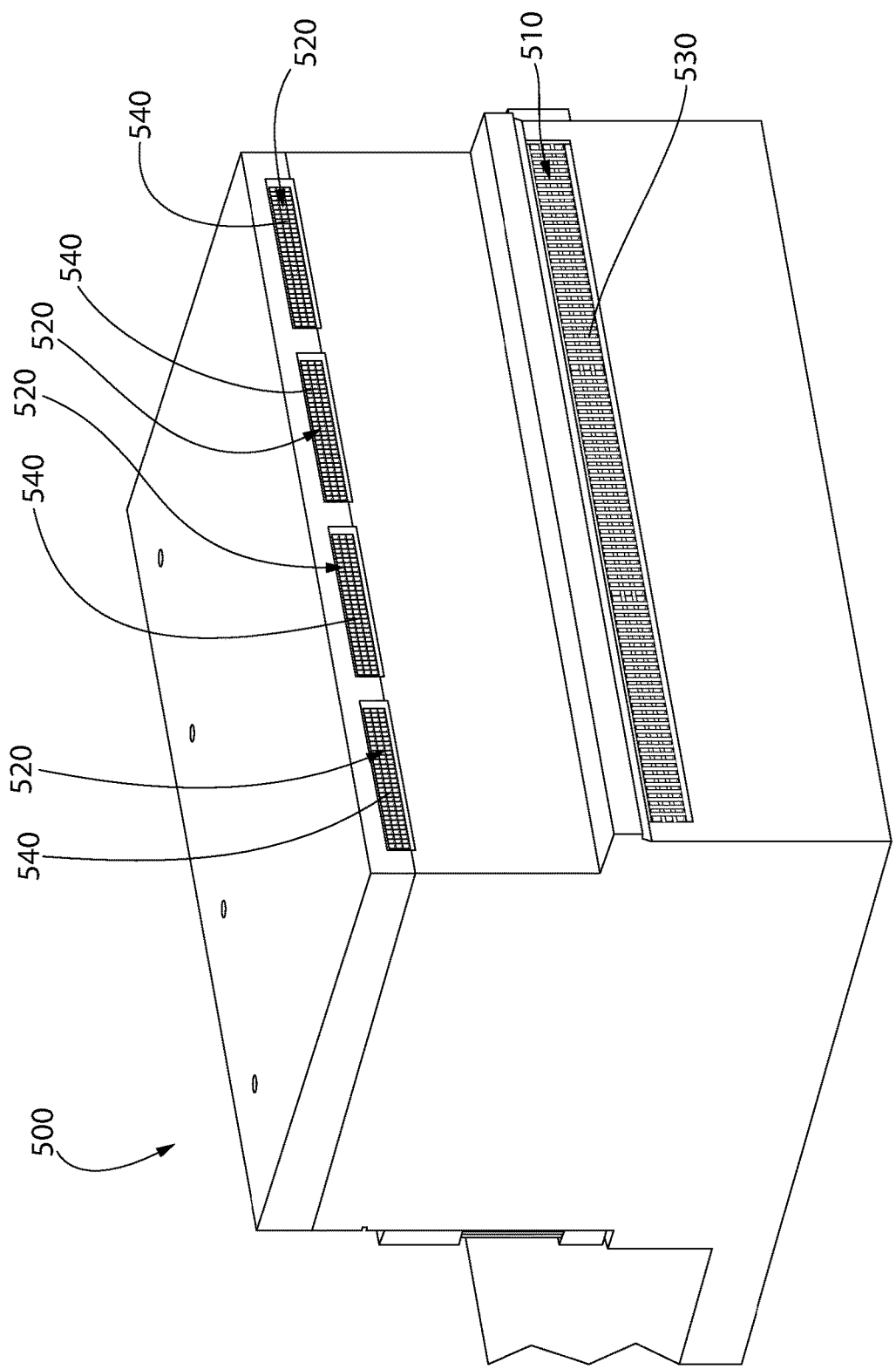
FIG. 11 is a perspective view of another type of ventilated system with air flow adjustment members in the inlet and outlet ducts thereof.

FIG. 11 illustrates a ventilated system 500 for storing a canister containing high level radioactive waste in accordance with another embodiment of the present invention. In FIG. 11, the ventilated system 500 is a horizontally oriented structure, which differs from the ventilated system 100 which is a vertically oriented structure. Thus, in the embodiment of FIG. 11, a canister much the same as the canister 200 described above is positioned within the storage cavity of the ventilated system 500. However, in this embodiment the canister is positioned horizontally rather than vertically. Generally, the heat rejection in horizontally oriented ventilated systems such as the ventilated system 500 are less efficient than with vertically oriented ventilated systems such as the ventilated system 100 because the ventilation air must flow across the curved surface of the canister shell causing the thermally ineffective Strouhal eddies in the wake zone. Nonetheless, the ventilation air in the horizontally oriented ventilated system 500 gets heated just the same.

In FIG. 11, the ventilated system 500 comprises an inlet duct 510 and a plurality of outlet ducts 520. Of course, the ventilated system 500 could include multiple inlet ducts 510 instead of just a single inlet duct 510 in alternative embodiments. Furthermore, the ventilated system 500 could include a single outlet duct 520 instead of multiple outlet ducts 520 in some embodiments. As shown, an air flow adjustment member 530 is positioned within the inlet duct 510 and an air flow adjustment member 540 is positioned within each of the outlet ducts 540. The air flow adjustment members 530, 540 generally have a similar structure to the air flow adjustment members 300, 300a, 300b described above, in that they comprise a gridwork of plates that form open portions for the air to flow through. The plates forming the air flow adjustment members 530, 540 may have varying thickness to vary the cross-sectional area of the inlet and outlet ducts 510, 520 when the air flow adjustment members 530, 540 are positioned therein. Thus, the methods and techniques described herein are as applicable to a horizontally oriented module as they are to a vertically oriented module.

Positioning the various air flow adjustment members in the inlet and/or outlet ducts 120, 125 as described herein increases the obstruction percentage of those ducts, which decreases the natural convective flow of the ventilation air through the ventilation passageway, thereby decreasing the heat rejection rate of the ventilated system 100. As a result, the temperature of the components of the ventilated system 100 and the canister 200 stored therein is increased, thereby mitigating and stress corrosion cracking. To the contrary, decreasing the obstruction percentage of the inlet ducts 120 (or the outlet ducts 125 as the case may be) increases the natural convective flow of the air through the ventilation passageway, thereby increasing the heat rejection rate of the ventilated system 100. As a result, in such a circumstance the temperature of the components of the ventilated system 100 and the canister 200 stored therein is decreased.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of storing high level radioactive waste comprising:
  a) positioning a metal canister containing high level radioactive waste in a storage cavity of a ventilated system comprising a cask body, a cask lid positioned atop the cask body, at least one outlet duct extending from a top of the storage cavity to an ambient atmosphere, and a plurality of inlet ducts, the plurality of inlet ducts having a combined cross-sectional area that is a sum of a cross-sectional area of each of the inlet ducts of the plurality of inlet ducts;
  b) convectively flowing ventilation air from the ambient atmosphere into a bottom of the storage cavity through the inlet ducts, the ventilation air being heated at a heating rate and rising from the bottom of the storage cavity to the top of the storage cavity, the ventilation air exiting the storage cavity through the at least one outlet duct; and c) progressively reducing the combined cross-sectional area of the plurality of inlet ducts over time to reduce an amount of the ventilation air that enters the storage cavity and maintain the heating rate of the ventilation air above a predetermined threshold;

wherein step c) comprises:

c-1) positioning a first air flow adjustment member in at least one of the plurality of inlet ducts, the first air flow adjustment member reducing the cross-sectional area of the at least one of the plurality of inlet ducts by a first percentage; and c-2) replacing the first air flow adjustment member with a second air flow adjustment member, the second air flow adjustment member reducing the cross-sectional area of the at least one of the plurality of inlet ducts by a second percentage that is greater than the first percentage;

wherein the first air flow adjustment member comprises a first gridwork of plates comprising a first set of parallel plates and a second set of parallel plates that are orthogonal to the first set of parallel plates, the first and second sets of parallel plates of the first gridwork of plates defining a plurality of openings having a combined first cross-sectional area that is less than the cross-sectional area of the at least one of the plurality of inlet ducts, wherein the second air flow adjustment member comprises a second gridwork of plates comprising a first set of parallel plates and a second set of parallel plates that are orthogonal to the first set of parallel plates, the first and second sets of parallel plates of the second gridwork of plates defining a plurality of openings having a combined second cross-sectional area that is less than the combined first cross-sectional area.

2. The method according to claim 1 wherein the first air flow adjustment member comprises an open portion through which the ventilation air can flow and a closed portion through which the ventilation air is prevented from flowing, the open portion of the first air flow adjustment member having a cross-sectional area that is less than the cross-sectional area of the at least one of the plurality of inlet ducts, and wherein the second air flow adjustment member comprises an open portion through which the ventilation aft can flow and a closed portion through which the ventilation air is prevented from flowing, the open portion of the second aft flow adjustment member having a cross-sectional area that is less than the cross-sectional area of the open portion of the first air flow adjustment member.

3. The method according to claim 1 wherein the first and second sets of parallel plates of the first gridwork of plates have a first combined thickness and the first and second sets of parallel plates of the second gridwork of plates have a second combined thickness that is greater than the first combined thickness.

4. The method according to claim 3 wherein each of the parallel plates of the first and second sets of parallel plates of the first gridwork of plates has a first thickness and each of the parallel plates of the first and second sets of parallel plates of the second gridwork of plates has a second thickness, the second thickness being greater than the first thickness.

5. The method according to claim 1 wherein each of the inlet ducts extends from a first opening in an outer surface of the cask body to a second opening in an inner surface of the cask body, and wherein the cross-sectional area of the inlet ducts is measured along the first opening.

6. The method according to claim 1 wherein step c) comprises positioning different air flow adjustment members in at least one of the plurality of inlet ducts over time such that each successive air flow adjustment member that is positioned in the at least one of the plurality of inlet ducts reduces the cross-sectional area of the at least one of the plurality of inlet ducts more than a preceding one of the air flow adjustment members that is positioned in the at least one of the plurality of inlet ducts.

7. The method according to claim 1 wherein step c) comprises progressively reducing the cross-sectional area of each of the plurality of inlet ducts over time to reduce the amount of the ventilation air that enters the storage cavity and to maintain the heating rate of the ventilation air above a predetermined threshold.

8. The method according to claim 1 wherein the at least one outlet duct has a cross-sectional area, and further comprising:

d) progressively reducing the cross-sectional area of the at least one outlet duct over time.

* * * * *